(12) United States Patent
Touchi et al.

(10) Patent No.: US 8,675,100 B2
(45) Date of Patent: Mar. 18, 2014

(54) ZOOM LENS SYSTEM, IMAGING DEVICE AND CAMERA

(75) Inventors: Yasunori Touchi, Osaka (JP); Takakazu Bito, Osaka (JP); Shinji Yamaguchi, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 349 days.

(21) Appl. No.: 13/093,861

(22) Filed: Apr. 26, 2011

(65) Prior Publication Data

US 2011/0261232 A1 Oct. 27, 2011

(30) Foreign Application Priority Data

Apr. 27, 2010 (JP) ................................. 2010-102639

(51) Int. Cl.
*H04N 5/262* (2006.01)
(52) U.S. Cl.
USPC .................................................... 348/240.99
(58) Field of Classification Search
None
See application file for complete search history.

(56) References Cited

FOREIGN PATENT DOCUMENTS

| JP | 2007-264174 A | 10/2007 |
|---|---|---|
| JP | 2007-279587 A | 10/2007 |
| JP | 2008-129076 A | 6/2008 |
| JP | 2008-304708 A | 12/2008 |
| JP | 2009-047785 A | 3/2009 |
| JP | 2009-163066 A | 7/2009 |
| JP | 2009-282398 A | 12/2009 |

*Primary Examiner* — Roberto Velez
*Assistant Examiner* — Stephen Coleman
(74) *Attorney, Agent, or Firm* — Judge Patent Associates

(57) ABSTRACT

A zoom lens system comprising a first lens unit having positive optical power, a second lens unit having negative optical power, a third lens unit having positive optical power, a fourth lens unit having negative optical power, and a fifth lens unit having positive optical power, wherein the third lens unit includes at least one lens element having positive optical power and at least one lens element having negative optical power, at least the first to third lens units are moved along an optical axis in zooming so that air spaces between the respective lens units vary, thereby performing magnification change, a lens unit positioned on the image side relative to an aperture diaphragm is moved along the optical axis in focusing, and the conditions: $8.1 < f_{G1}/Ir < 10.4$ and $Z = f_T/f_W \geq 9.0$ ($f_{G1}$: a composite focal length of the first lens unit, $Ir = f_T \times \tan(\omega_T)$, $\omega_T$: a half view angle at a telephoto limit, $f_T$ and $f_W$: focal lengths of the entire system at a telephoto limit and at a wide-angle limit) are satisfied; an imaging device; and a camera are provided.

11 Claims, 19 Drawing Sheets

ZOOM LENS SYSTEM, IMAGING DEVICE AND CAMERA

CROSS-REFERENCE TO RELATED APPLICATION

This application is based on application No. 2010-102639 filed in Japan on Apr. 27, 2010, the contents of which are hereby incorporated by reference.

BACKGROUND OF THE INVENTION

1. Field of the Invention

The present invention relates to a zoom lens system, an imaging device, and a camera. In particular, the present invention relates to: a zoom lens system which is compact but has a wide view angle at a wide-angle limit and a high zooming ratio, and still is able to perform rapid focusing and has high optical performance particularly in a close-object in-focus condition; an imaging device employing the zoom lens system; and a thin and compact camera employing the imaging device.

2. Description of the Background Art

Size reduction and high performance, particularly, a high zooming ratio, are strongly required of cameras having image sensors performing photoelectric conversion, such as digital still cameras and digital video cameras (simply referred to as digital cameras, hereinafter). In recent years, high-speed focusing and high optical performance in a close-object in-focus condition are increasingly required.

As examples of such zoom lens system having a high zooming ratio, there have conventionally been proposed various kinds of zoom lens systems and imaging optical systems, each having a five-unit configuration of positive, negative, positive, negative, and positive, in which, for example, a first lens unit having positive optical power, a second lens unit having negative optical power, a third lens unit having positive optical power, a fourth lens unit having negative optical power, and a fifth lens unit having positive optical power are arranged in order from the object side to the image side.

Japanese Laid-Open Patent Publication No. 2007-279587 discloses a zoom lens having the five-unit configuration of positive, negative, positive, negative, and positive, in which air spaces between the respective lens units, the first to fifth lens units, are varied to perform magnification change, the interval between the first and second lens units is increased while the interval between the second and third lens units is reduced at a telephoto limit relative to a wide-angle limit, the first lens unit comprises a lens element, the second lens unit includes a positive lens and a negative lens, and the total number of lenses in the first and second lens units is four or less.

Japanese Laid-Open Patent Publication No. 2009-282398 discloses a zoom lens having the five-unit configuration of positive, negative, positive, negative, and positive, in which, in zooming from a wide-angle limit to a telephoto limit, all the lens units are moved so that the interval between the first and second lens units is increased and the interval between the third and fifth lens units is increased, and the relationships among the focal length of the fourth lens unit, the focal length of the fifth lens unit, the focal length of the entire system at a wide-angle limit, and the focal length of the entire system at a telephoto limit are set forth.

Japanese Laid-Open Patent Publication No. 2009-163066 discloses a zoom lens having the five-unit configuration of positive, negative, positive, negative, and positive, in which the intervals between the respective lens units are varied to perform magnification change, the first lens unit comprises a negative lens and at least one positive lens, and the relationship between the refractive index and the Abbe number, to the d-line of the negative lens in the first lens unit, is set forth.

Japanese Laid-Open Patent Publication No. 2009-047785 discloses a zoom lens having the five-unit configuration of positive, negative, positive, negative, and positive, in which, when the lens positions are changed from a wide-angle limit to a telephoto limit, at least the second lens unit moves to the image side, the third lens unit moves to the object side, the fourth lens unit is fixed in the optical axis direction, an aperture diaphragm is arranged close to the object side of the third lens unit, the relationship between the focal length of the second lens unit and the focal length of the fourth lens unit is set forth, and the relationship between the amount of movement of the third lens unit when the lens positions are changed and the focal length of the entire lens system at the telephoto limit is set forth.

Japanese Laid-Open Patent Publication No. 2007-264174 discloses an imaging optical system having the five-unit configuration of positive, negative, positive, negative, and positive, in which the fourth lens unit is fixed relative to the image surface and the intervals between the respective lens units are varied at the time of magnification change from a wide-angle limit to a telephoto limit, the fourth lens unit moves in a direction substantially vertical to the optical axis at the time of image blur compensation, the relationship between the focal length of the first lens unit and the focal length of the entire system at the wide-angle limit is set forth, and the relationship between the focal length of the fourth lens unit and the focal length of the entire system at the telephoto limit is set forth.

Japanese Laid-Open Patent Publication No. 2008-304708 discloses a zoom lens having the five-unit configuration of positive, negative, positive, negative, and positive, in which an optical diaphragm is positioned between the second lens unit and the fourth lens unit, the fourth lens unit comprises a negative lens having at least one aspheric surface and a paraxial radius of curvature of its image side surface, which is smaller than that of its object side surface, and the relationships among the focal length of the fourth lens unit, the focal length of the entire system at a wide-angle limit, and the focal length of the entire system at a telephoto limit are set forth.

The zoom lenses and the imaging optical system, which are disclosed in the above-described patent literatures, are downsized enough to be applicable to thin and compact digital cameras, and have a relatively wide view angle at a wide-angle limit or have a high zooming ratio of about 9 or more. However, these conventional zoom lenses and imaging optical system are not sufficient in the focusing speed and the optical performance in the close-object in-focus condition, and therefore, do not meet the requirements for digital cameras in recent years.

SUMMARY OF THE INVENTION

An object of the present invention is to provide: a zoom lens system which is compact but has a wide view angle at a wide-angle limit and a high zooming ratio, and still is able to perform rapid focusing and has high optical performance particularly in a close-object in-focus condition; an imaging device employing the zoom lens system; and a thin and compact camera employing the imaging device.

The novel concepts disclosed herein were achieved in order to solve the foregoing problems in the conventional art, and herein is disclosed:

a zoom lens system, in order from an object side to an image side, comprising a first lens unit having positive optical power, a second lens unit having negative optical power, a third lens unit having positive optical power, a fourth lens unit having negative optical power, and a fifth lens unit having positive optical power, wherein the third lens unit includes at least one lens element having positive optical power and at least one lens element having negative optical power, in zooming from a wide-angle limit to a telephoto limit at the time of image taking, at least the first lens unit, the second lens unit, and the third lens unit are individually moved along an optical axis so that air spaces between the respective lens units vary, thereby performing magnification change, in focusing from an infinity in-focus condition to a close-object in-focus condition, a lens unit positioned on the image side relative to an aperture diaphragm is moved along the optical axis, and the following conditions (1-2) and (a) are satisfied:

$$8.1 < f_{G1}/Ir < 10.4 \quad (1\text{-}2)$$

$$Z = f_T/f_W \geq 9.0 \quad (a)$$

where $f_{G1}$ is a composite focal length of the first lens unit,

Ir is a value represented by the following equation:

$$Ir = f_T \times \tan(\omega_T),$$

$\omega_T$ is a half view angle (°) at a telephoto limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms an optical image of the object; and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, a fourth lens unit having negative optical power, and a fifth lens unit having positive optical power, in which the third lens unit includes at least one lens element having positive optical power and at least one lens element having negative optical power, in zooming from a wide-angle limit to a telephoto limit at the time of image taking, at least the first lens unit, the second lens unit, and the third lens unit are individually moved along an optical axis so that air spaces between the respective lens units vary, thereby performing magnification change, in focusing from an infinity in-focus condition to a close-object in-focus condition, a lens unit positioned on the image side relative to an aperture diaphragm is moved along the optical axis, and the following conditions (1-2) and (a) are satisfied:

$$8.1 < f_{G1}/Ir < 10.4 \quad (1\text{-}2)$$

$$Z = f_T/f_W \geq 9.0 \quad (a)$$

where $f_{G1}$ is a composite focal length of the first lens unit,

Ir is a value represented by the following equation:

$$Ir = f_T \times \tan(\omega_T),$$

$\omega_T$ is a half view angle (°) at a telephoto limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, a fourth lens unit having negative optical power, and a fifth lens unit having positive optical power, in which the third lens unit includes at least one lens element having positive optical power and at least one lens element having negative optical power, in zooming from a wide-angle limit to a telephoto limit at the time of image taking, at least the first lens unit, the second lens unit, and the third lens unit are individually moved along an optical axis so that air spaces between the respective lens units vary, thereby performing magnification change, in focusing from an infinity in-focus condition to a close-object in-focus condition, a lens unit positioned on the image side relative to an aperture diaphragm is moved along the optical axis, and the following conditions (1-2) and (a) are satisfied:

$$8.1 < f_{G1}/Ir < 10.4 \quad (1\text{-}2)$$

$$Z = f_T/f_W \geq 9.0 \quad (a)$$

where $f_{G1}$ is a composite focal length of the first lens unit,

Ir is a value represented by the following equation:

$$Ir = f_T \times \tan(\omega_T),$$

$\omega_T$ is a half view angle (°) at a telephoto limit, $f_T$ is a focal length of the entire system at a telephoto limit, and $f_W$ is a focal length of the entire system at a wide-angle limit.

According to the present invention, it is possible to provide: a zoom lens system which is compact but has a wide view angle at a wide-angle limit and a high zooming ratio, and still is able to perform rapid focusing and has high optical performance particularly in a close-object in-focus condition; an imaging device employing the zoom lens system; and a thin and compact camera employing the imaging device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 6

Figure 1:
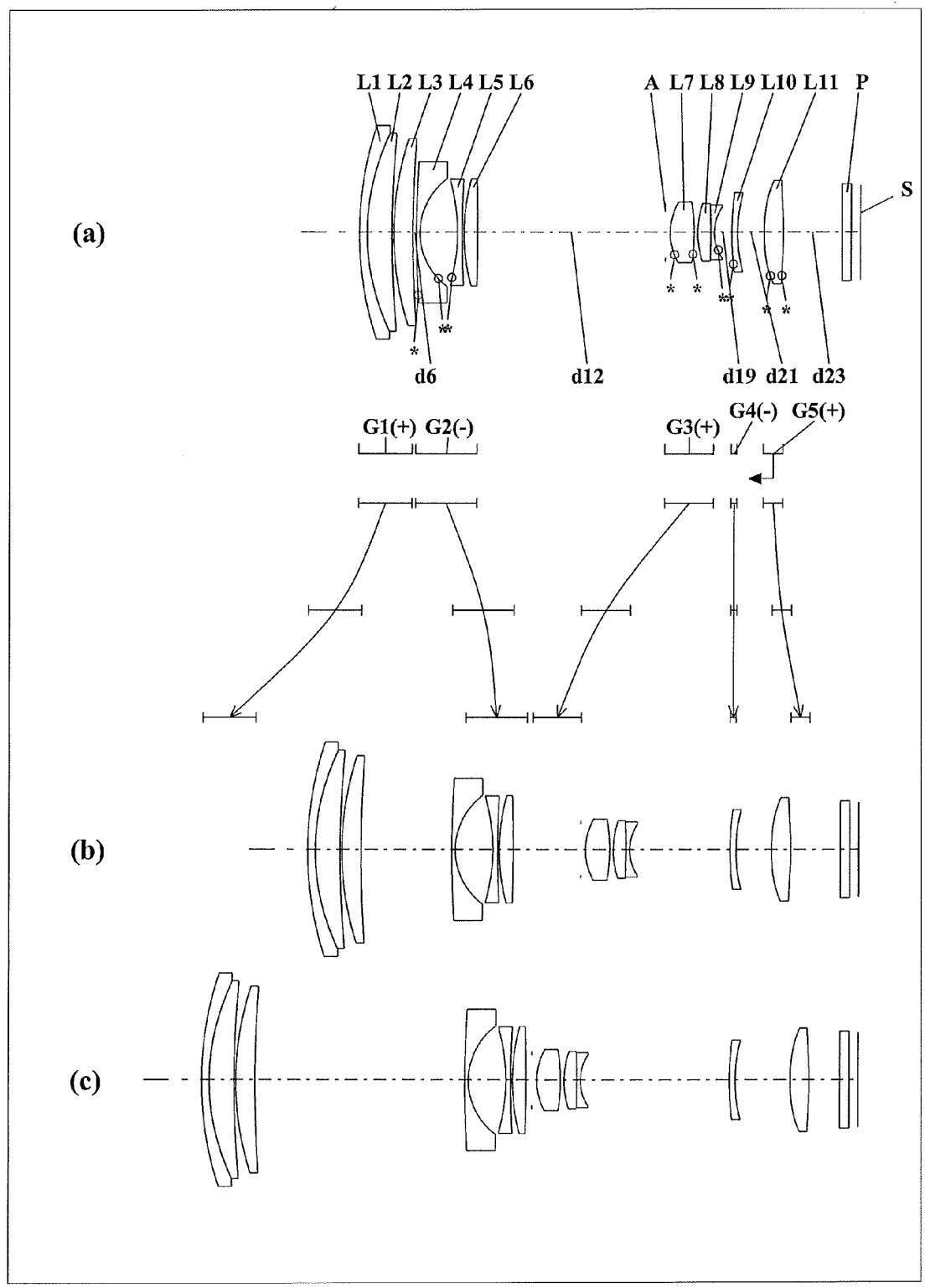
FIG. 1 is a lens arrangement diagram showing an infinity in-focus condition of a zoom lens system according to Embodiment 1 (Example 1)
Figure 2:
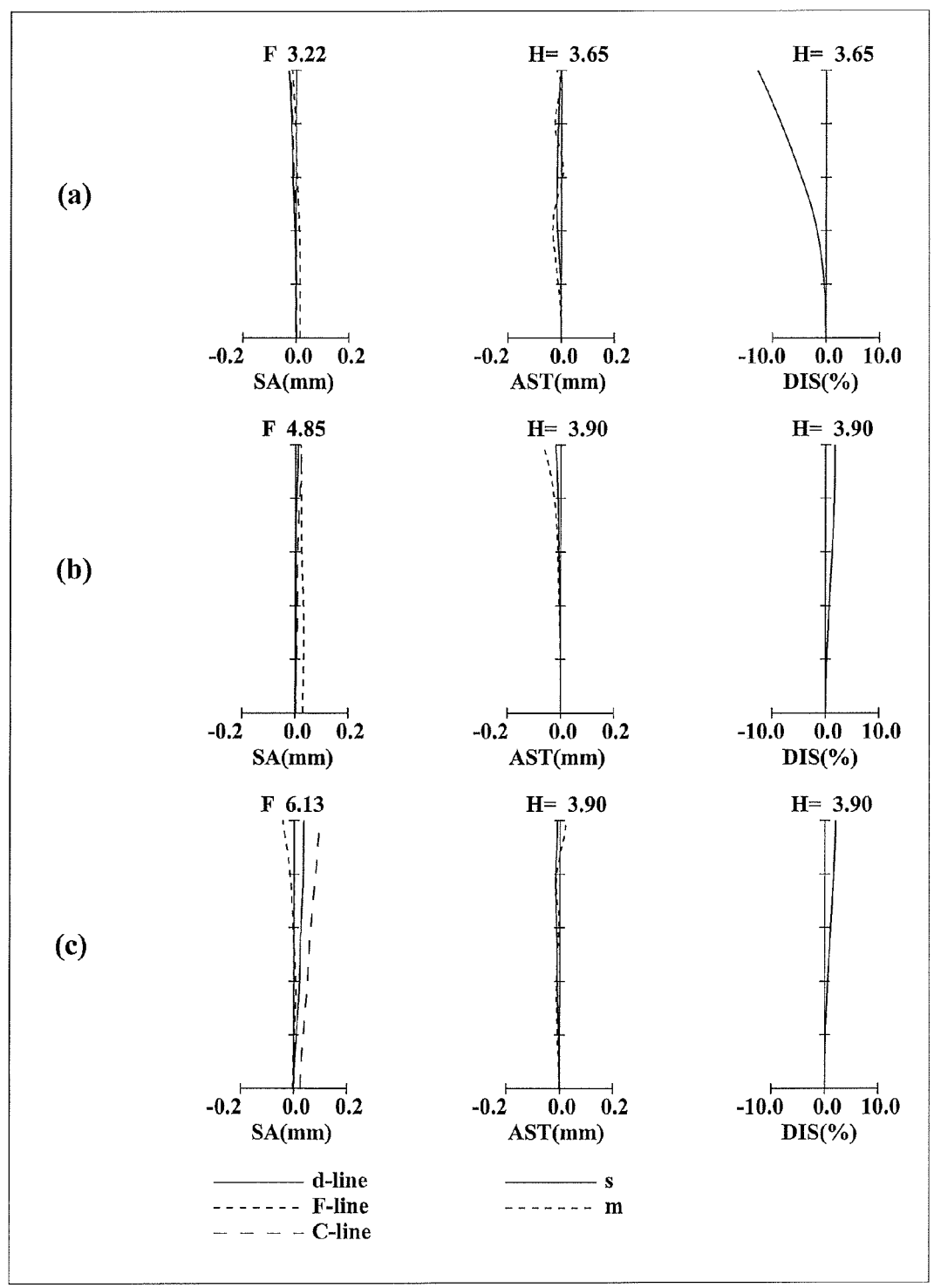
FIG. 2 is a longitudinal aberration diagram of an infinity in-focus condition of a zoom lens system according to Example 1.
Figure 3:
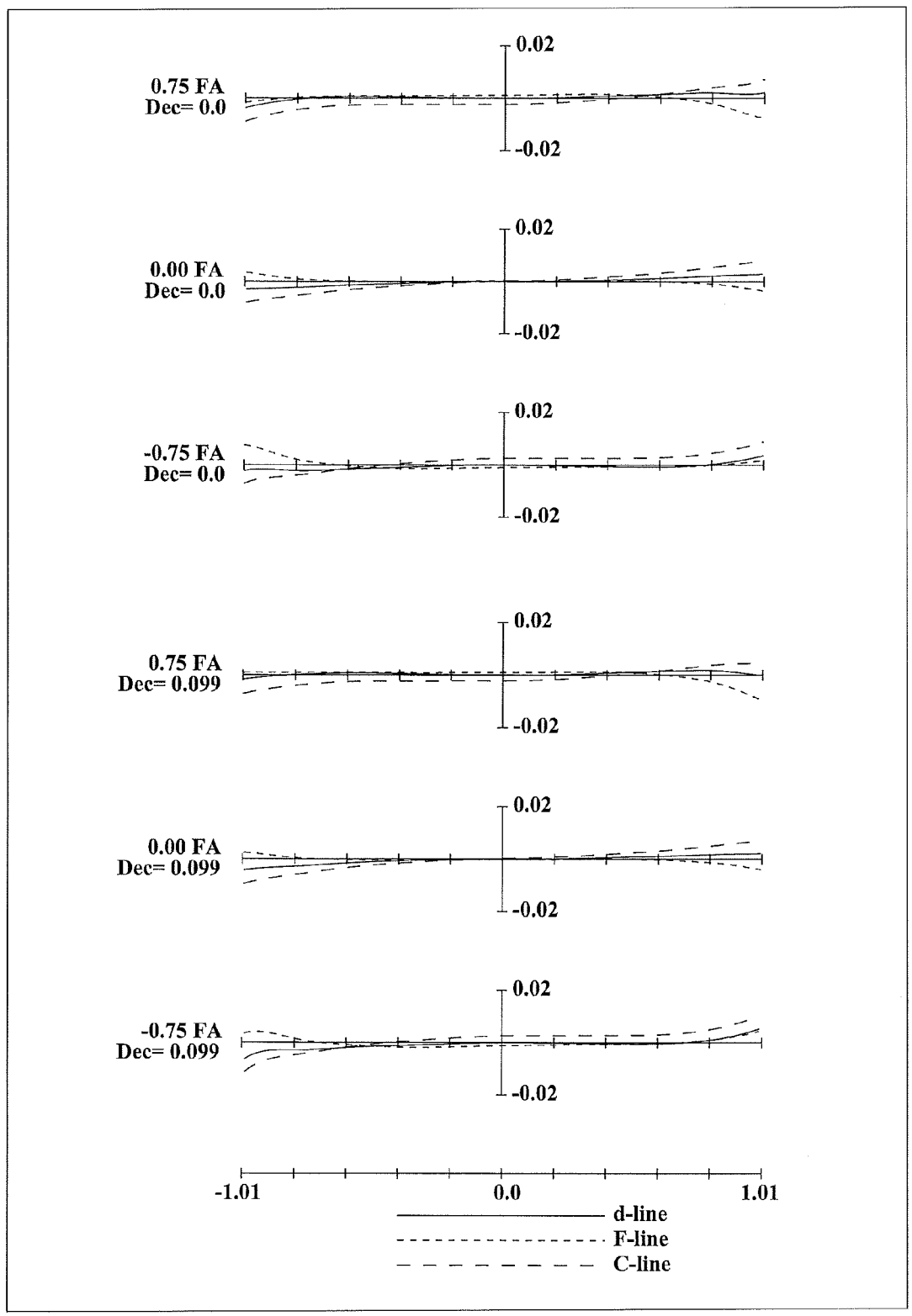
FIG. 3 is a lateral aberration diagram of a zoom lens system according to Example 1 at a telephoto limit in a basic state where image blur compensation is not performed and in a blur compensation state.

FIGS. 1, 4, 7, 10, 13, and 16 are lens arrangement diagrams of zoom lens systems according to Embodiments 1 to 6, respectively.

Each of FIGS. 1, 4, 7, 10, 13, and 16 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having positive optical power; a second lens unit G2 having negative optical power; a third lens unit G3 having positive optical power; a fourth lens unit G4 having negative optical power; and a fifth lens unit G5 having positive optical power. In zooming, at least the first lens unit G1, the second lens unit G2, and the third lens unit G3 move in a direction along the optical axis so that the intervals between the respective lens units, that is, the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5, should all vary. In the zoom lens system according to each embodiment, since these lens units are arranged in the desired optical power configuration, size reduction in the entire lens system is achieved while maintaining high optical performance.

In FIGS. 1, 4, 7, 10, 13, and 16, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fifth lens unit G5), a plane parallel plate P equivalent to an optical low-pass filter or a face plate of an image sensor is provided.

Further, as shown in FIGS. 1, 4, 7, 10, 13, and 16, an aperture diaphragm A is provided between the second lens unit G2 and the third lens unit G3.

As shown in FIG. 1, in the zoom lens system according to Embodiment 1, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data in the corresponding numerical example described later, surface number 2 indicates a cement layer between the first lens element L1 and the second lens element L2.

In the zoom lens system according to Embodiment 1, the second lens unit G2, in order from the object side to the image side, comprises: a negative meniscus fourth lens element L4 with the convex surface facing the object side; a bi-concave fifth lens element L5; and a bi-convex sixth lens element L6.

Among these, the fourth lens element L4 has two aspheric surfaces, and the fifth lens element L5 has an aspheric object side surface.

In the zoom lens system according to Embodiment 1, the third lens unit G3, in order from the object side to the image side, comprises: a bi-convex seventh lens element L7; a bi-convex eighth lens element L8; and a bi-concave ninth lens element L9. Among these, the eighth lens element L8 and the ninth lens element L9 are cemented with each other. In the surface data in the corresponding numerical example described later, surface number 17 indicates a cement layer between the eighth lens element L8 and the ninth lens element L9. The seventh lens element L7 has two aspheric surfaces, and the ninth lens element L9 has an aspheric image side surface.

In the zoom lens system according to Embodiment 1, the fourth lens unit G4 comprises solely a negative meniscus tenth lens element L10 with the convex surface facing the object side. The tenth lens element L10 has an aspheric object side surface.

In the zoom lens system according to Embodiment 1, the fifth lens unit G5 comprises solely a bi-convex eleventh lens element L11. The eleventh lens element L11 has two aspheric surfaces.

In the zoom lens system according to Embodiment 1, an aperture diaphragm A is provided on the object side relative to the third lens unit G3 (between the sixth lens element L6 and the seventh lens element L7), and a plane parallel plate P is provided on the object side relative to the image surface S (between the image surface S and the eleventh lens element L11).

In the zoom lens system according to Embodiment 1, in zooming from a wide-angle limit to a telephoto limit at the time of image taking, the first lens unit G1 and the third lens unit G3 move to the object side, the second lens unit G2 and the fifth lens unit G5 move to the image side, and the fourth lens unit G4 is fixed relative to the image surface S. That is, in zooming, the individual lens units other than the fourth lens unit G4 move along the optical axis so that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should increase. Further, in zooming from a wide-angle limit to a telephoto limit at the time of image taking, the aperture diaphragm A moves integrally with the third lens unit G3 along the optical axis.

Further, in the zoom lens system according to Embodiment 1, in focusing from an infinity in-focus condition to a close-object in-focus condition, the fifth lens unit G5 moves to the object side along the optical axis.

Figure 4:
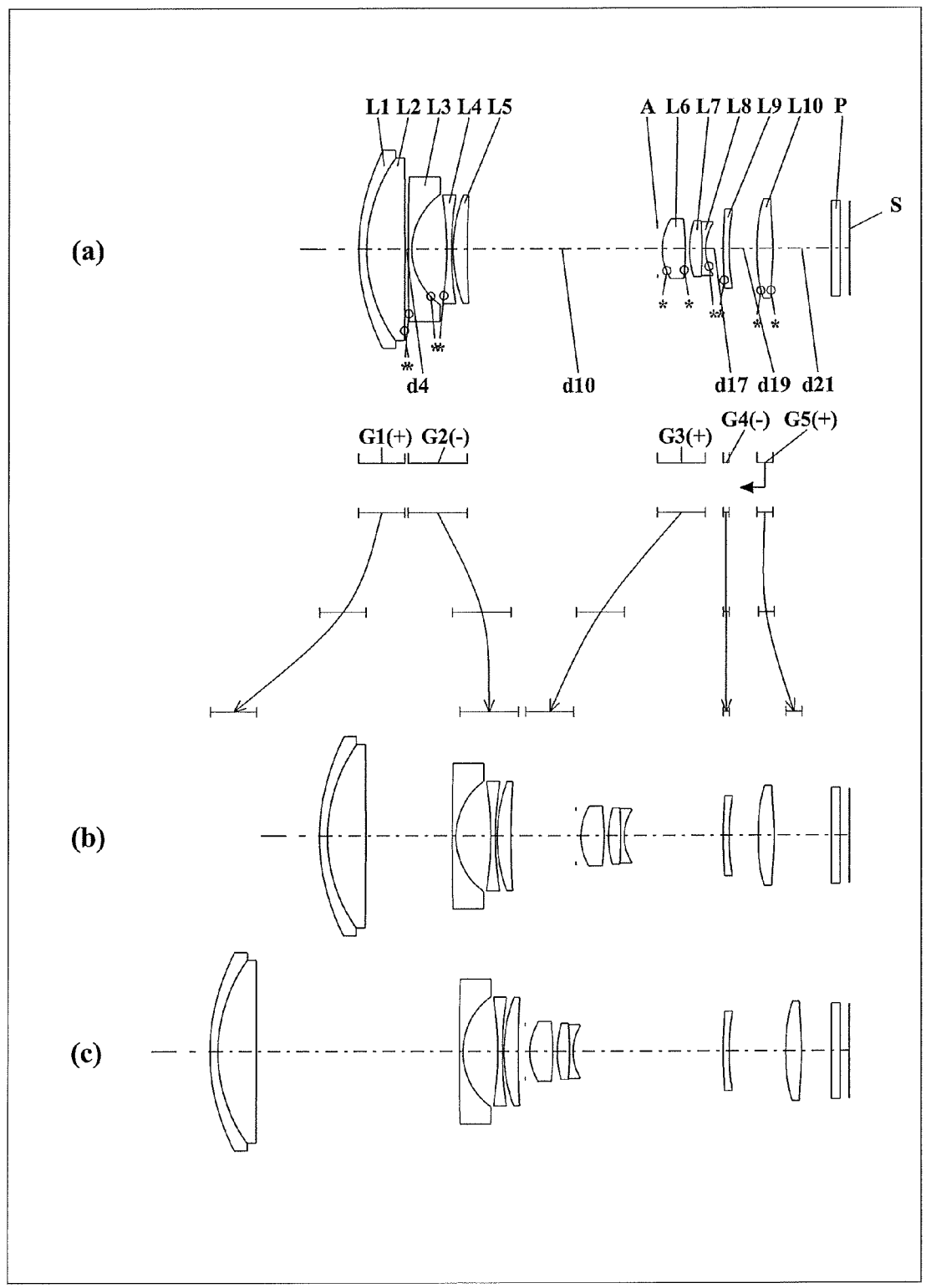
FIG. 4 is a lens arrangement diagram showing an infinity in-focus condition of a zoom lens system according to Embodiment 2 (Example 2)
Figure 5:
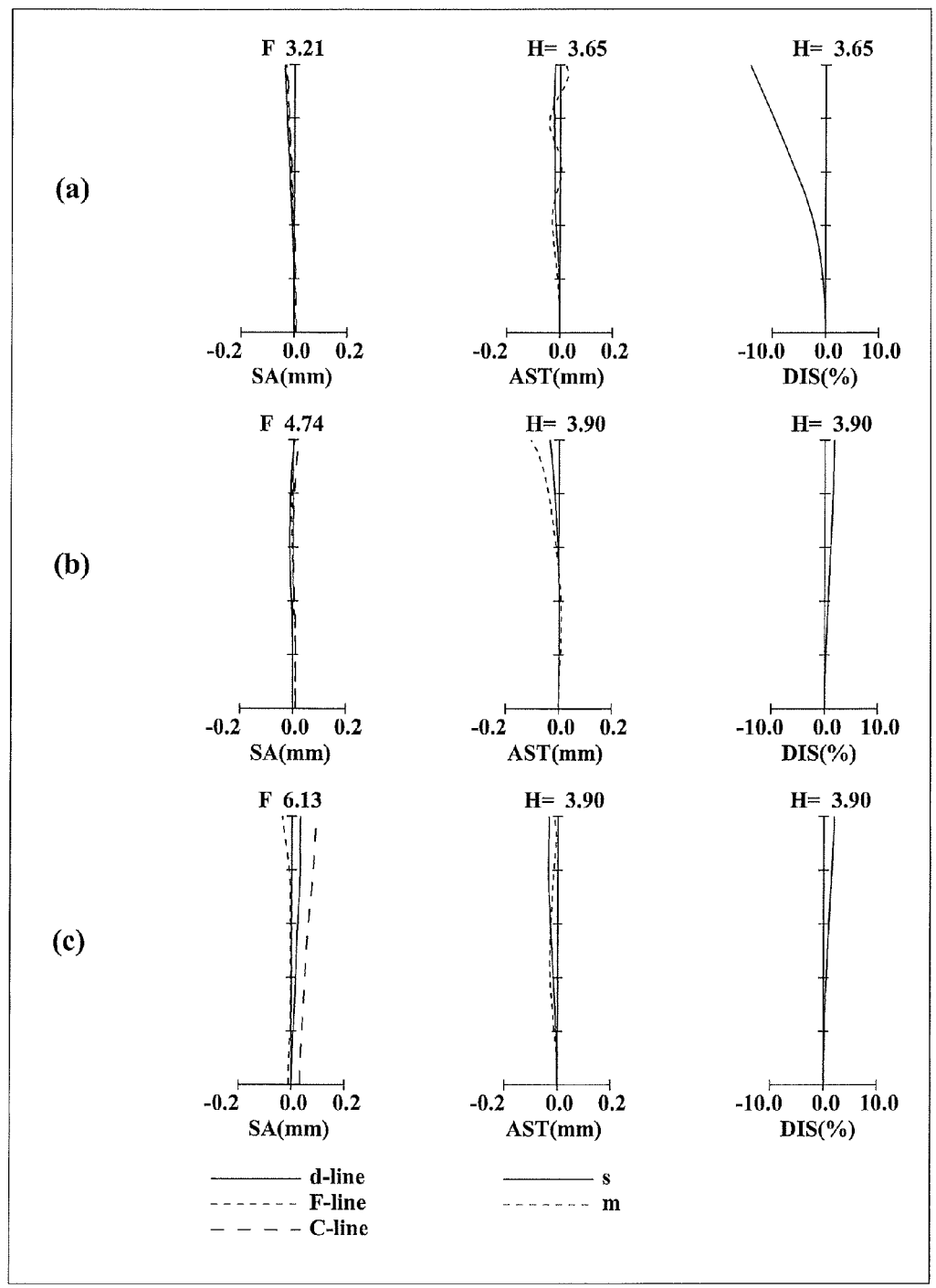
FIG. 5 is a longitudinal aberration diagram of an infinity in-focus condition of a zoom lens system according to Example 2.
Figure 6:
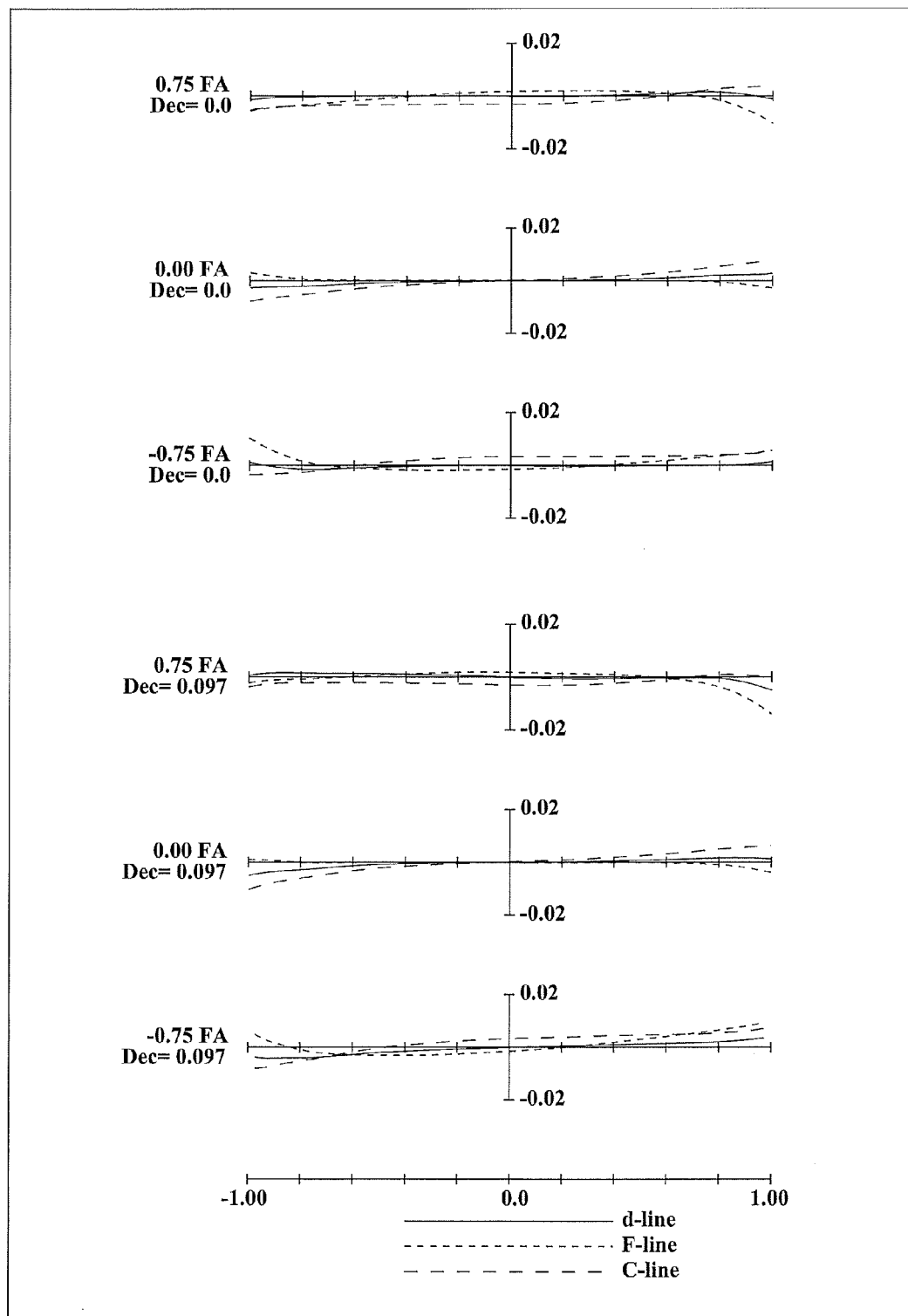
FIG. 6 is a lateral aberration diagram of a zoom lens system according to Example 2 at a telephoto limit in a basic state where image blur compensation is not performed and in a blur compensation state.

As shown in FIG. 4, in the zoom lens system according to Embodiment 2, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. In the surface data in the corresponding numerical example described later, surface number 2 indicates a cement layer between the first lens element L1 and the second lens element L2. The second lens element L2 has an aspheric image side surface.

In the zoom lens system according to Embodiment 2, the second lens unit G2, in order from the object side to the image side, comprises: negative meniscus third lens element L3 with the convex surface facing the object side; a bi-concave fourth lens element L4; and a positive meniscus fifth lens element L5 with the convex surface facing the object side. Among these, the third lens element L3 has two aspheric surfaces, and the fourth lens element L4 has an aspheric object side surface.

In the zoom lens system according to Embodiment 2, the third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data in the corresponding numerical example described later, surface number 15 indicates a cement layer between the seventh lens element L7 and the eighth lens element L8. The sixth lens element L6 has two aspheric surfaces, and the eighth lens element L8 has an aspheric image side surface.

In the zoom lens system according to Embodiment 2, the fourth lens unit G4 comprises solely a negative meniscus ninth lens element L9 with the convex surface facing the object side. The ninth lens element L9 has an aspheric object side surface.

In the zoom lens system according to Embodiment 2, the fifth lens unit G5 comprises solely a bi-convex tenth lens element L10. The tenth lens element L10 has two aspheric surfaces.

In the zoom lens system according to Embodiment 2, an aperture diaphragm A is provided on the object side relative to the third lens unit G3 (between the fifth lens element L5 and the sixth lens element L6), and a plane parallel plate P is provided on the object side relative to the image surface S (between the image surface S and the tenth lens element L10).

In the zoom lens system according to Embodiment 2, in zooming from a wide-angle limit to a telephoto limit at the time of image taking, the first lens unit G1 and the third lens unit G3 move to the object side, the second lens unit G2 and the fifth lens unit G5 move to the image side, and the fourth lens unit G4 is fixed relative to the image surface S. That is, in zooming, the individual lens units other than the fourth lens unit G4 move along the optical axis so that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should increase. Further, in zooming from a wide-angle limit to a telephoto limit at the time of image taking, the aperture diaphragm A moves integrally with the third lens unit G3 along the optical axis.

Further, in the zoom lens system according to Embodiment 2, in focusing from an infinity in-focus condition to a close-object in-focus condition, the fifth lens unit G5 moves to the object side along the optical axis.

Figure 7:
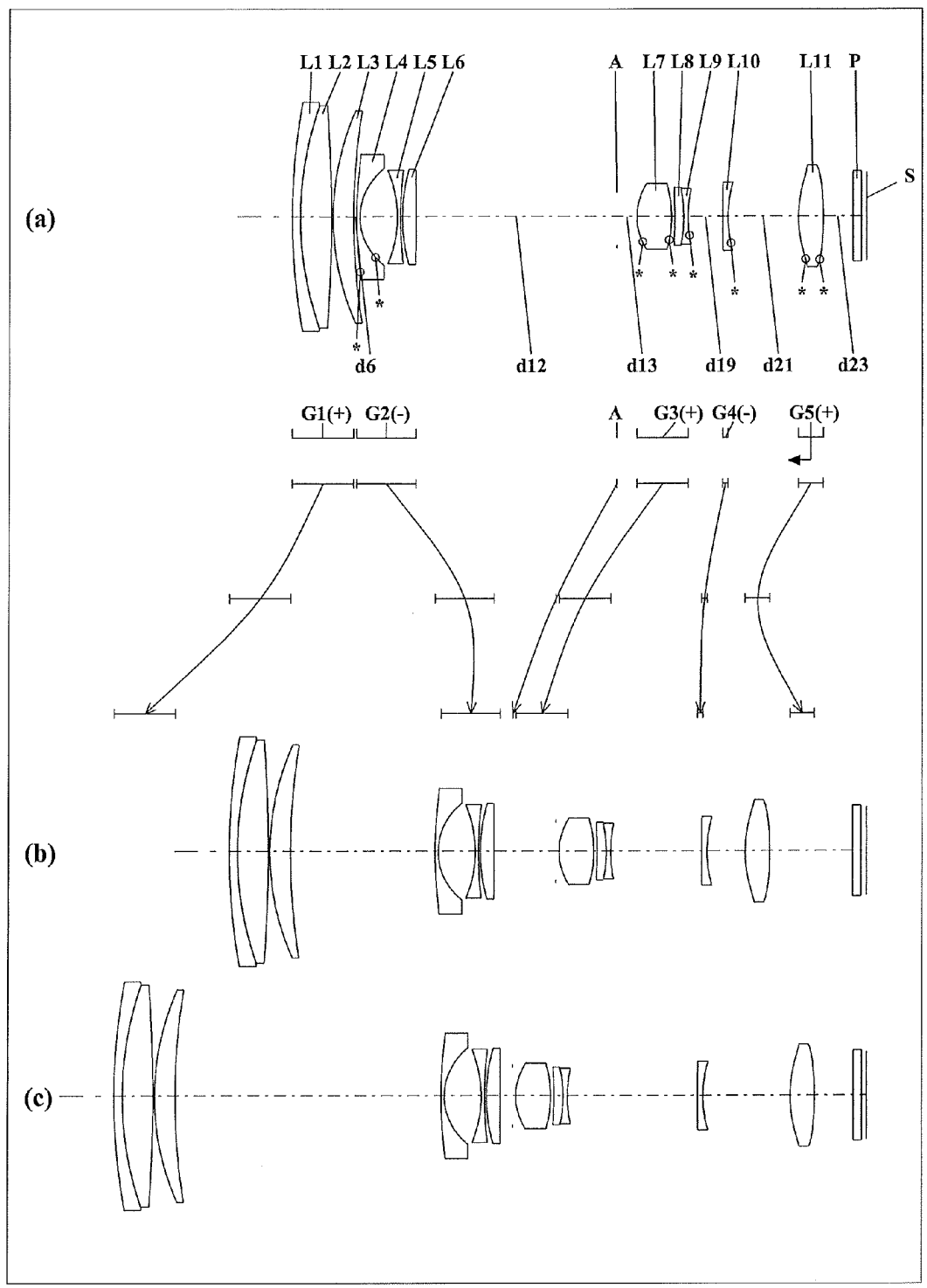
FIG. 7 is a lens arrangement diagram showing an infinity in-focus condition of a zoom lens system according to Embodiment 3 (Example 3)
Figure 8:
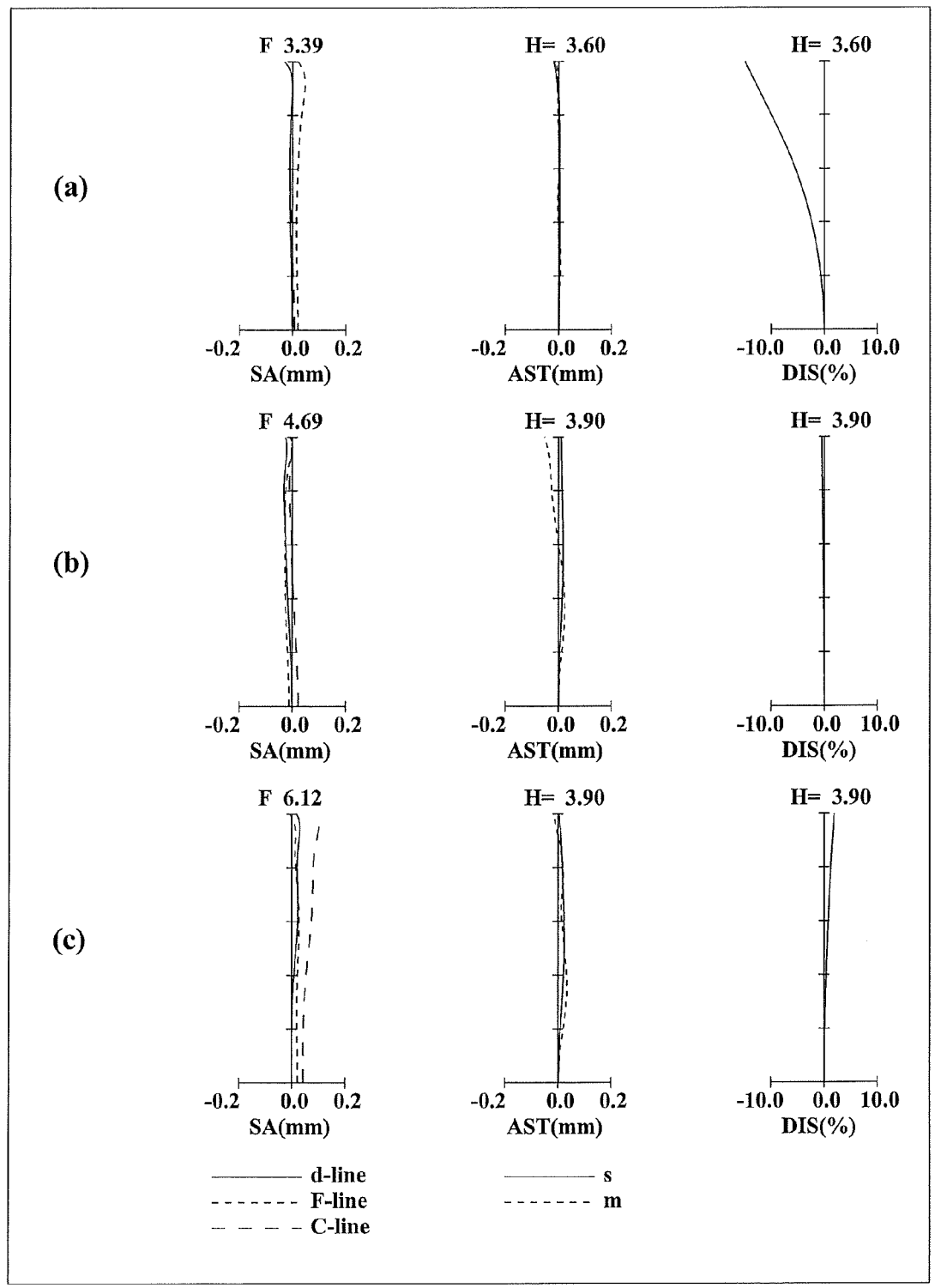
FIG. 8 is a longitudinal aberration diagram of an infinity in-focus condition of a zoom lens system according to Example 3.
Figure 9:
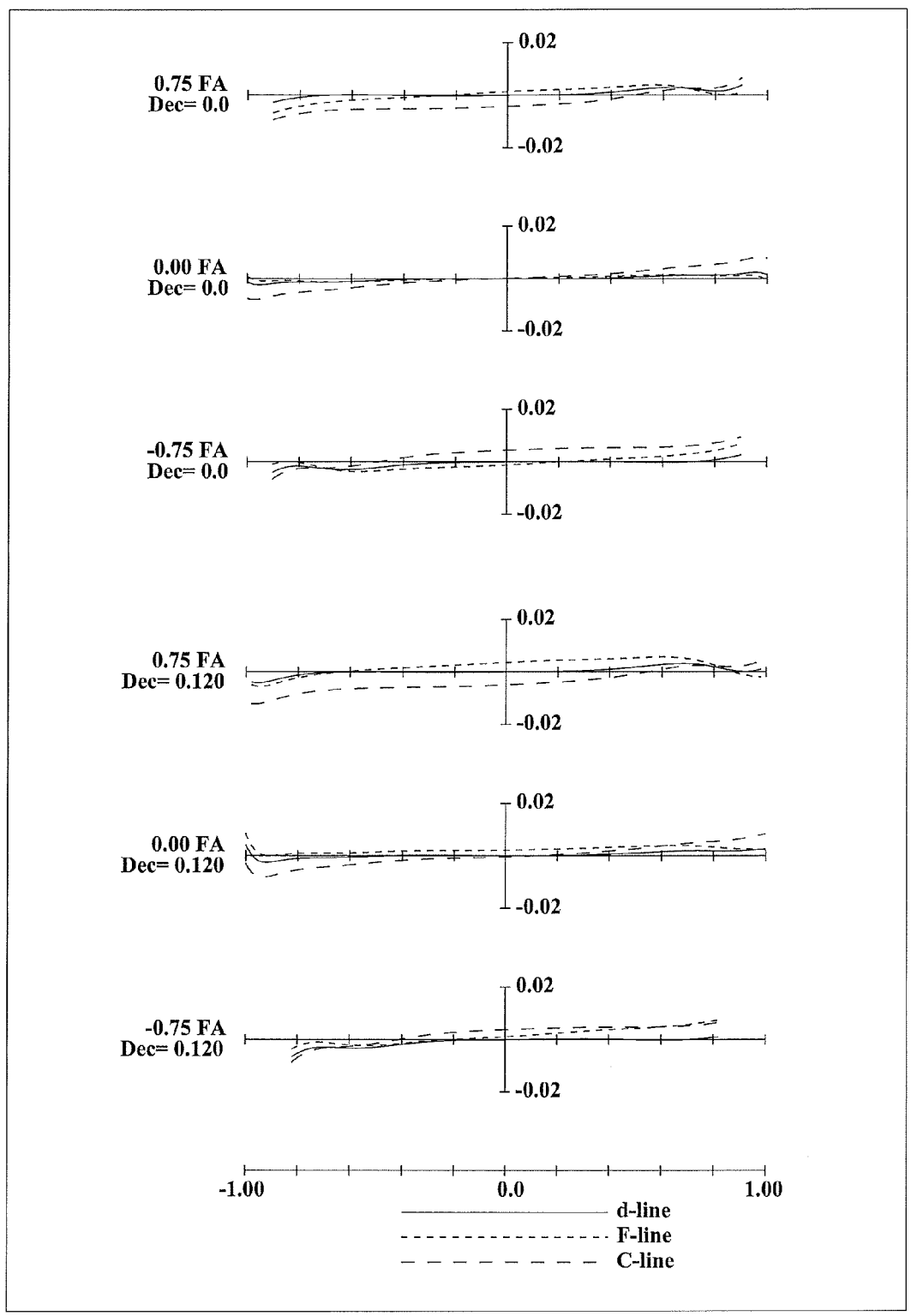
FIG. 9 is a lateral aberration diagram of a zoom lens system according to Example 3 at a telephoto limit in a basic state where image blur compensation is not performed and in a blur compensation state.

As shown in FIG. 7, in the zoom lens system according to Embodiment 3, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data in the corresponding numerical example described later, surface number 2 indicates a cement layer between the first lens element L1 and the second lens element L2.

In the zoom lens system according to Embodiment 3, the second lens unit G2, in order from the object side to the image side, comprises: a negative meniscus fourth lens element L4 with the convex surface facing the object side; a bi-concave fifth lens element L5; and a bi-convex sixth lens element L6. Among these, the fourth lens element L4 has two aspheric surfaces.

In the zoom lens system according to Embodiment 3, the third lens unit G3, in order from the object side to the image side, comprises: a bi-convex seventh lens element L7; a positive meniscus eighth lens element L8 with the convex surface facing the image side; and a bi-concave ninth lens element L9. Among these, the eighth lens element L8 and the ninth lens element L9 are cemented with each other. In the surface data in the corresponding numerical example described later, surface number 17 indicates a cement layer between the eighth lens element L8 and the ninth lens element L9. The seventh lens element L7 has two aspheric surfaces, and the ninth lens element L9 has an aspheric image side surface.

In the zoom lens system according to Embodiment 3, the fourth lens unit G4 comprises solely a negative meniscus tenth lens element L10 with the convex surface facing the object side. The tenth lens element L10 has an aspheric image side surface.

In the zoom lens system according to Embodiment 3, the fifth lens unit G5 comprises solely a bi-convex eleventh lens element L11. The eleventh lens element L11 has two aspheric surfaces.

In the zoom lens system according to Embodiment 3, an aperture diaphragm A is provided on the object side relative to the third lens unit G3 (between the sixth lens element L6 and the seventh lens element L7), and a plane parallel plate P is provided on the object side relative to the image surface S (between the image surface S and the eleventh lens element L11).

In the zoom lens system according to Embodiment 3, in zooming from a wide-angle limit to a telephoto limit at the time of image taking, the first lens unit G1, the third lens unit G3, and the fourth lens unit G4 move to the object side, the second lens unit G2 moves to the image side, and the fifth lens unit G5 moves with locus of a convex to the object side so that the position of the fifth lens unit G5 at the telephoto limit is approximately equal to the position at the wide-angle limit. That is, in zooming, the individual lens units move along the optical axis so that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should increase. Further, in zooming from a wide-angle limit to a telephoto limit at the time of image taking, the aperture diaphragm A moves along the optical axis with the interval between the aperture diaphragm A and the third lens unit G3 being varied.

Further, in the zoom lens system according to Embodiment 3, in focusing from an infinity in-focus condition to a close-object in-focus condition, the fifth lens unit G5 moves to the object side along the optical axis.

Figure 10:
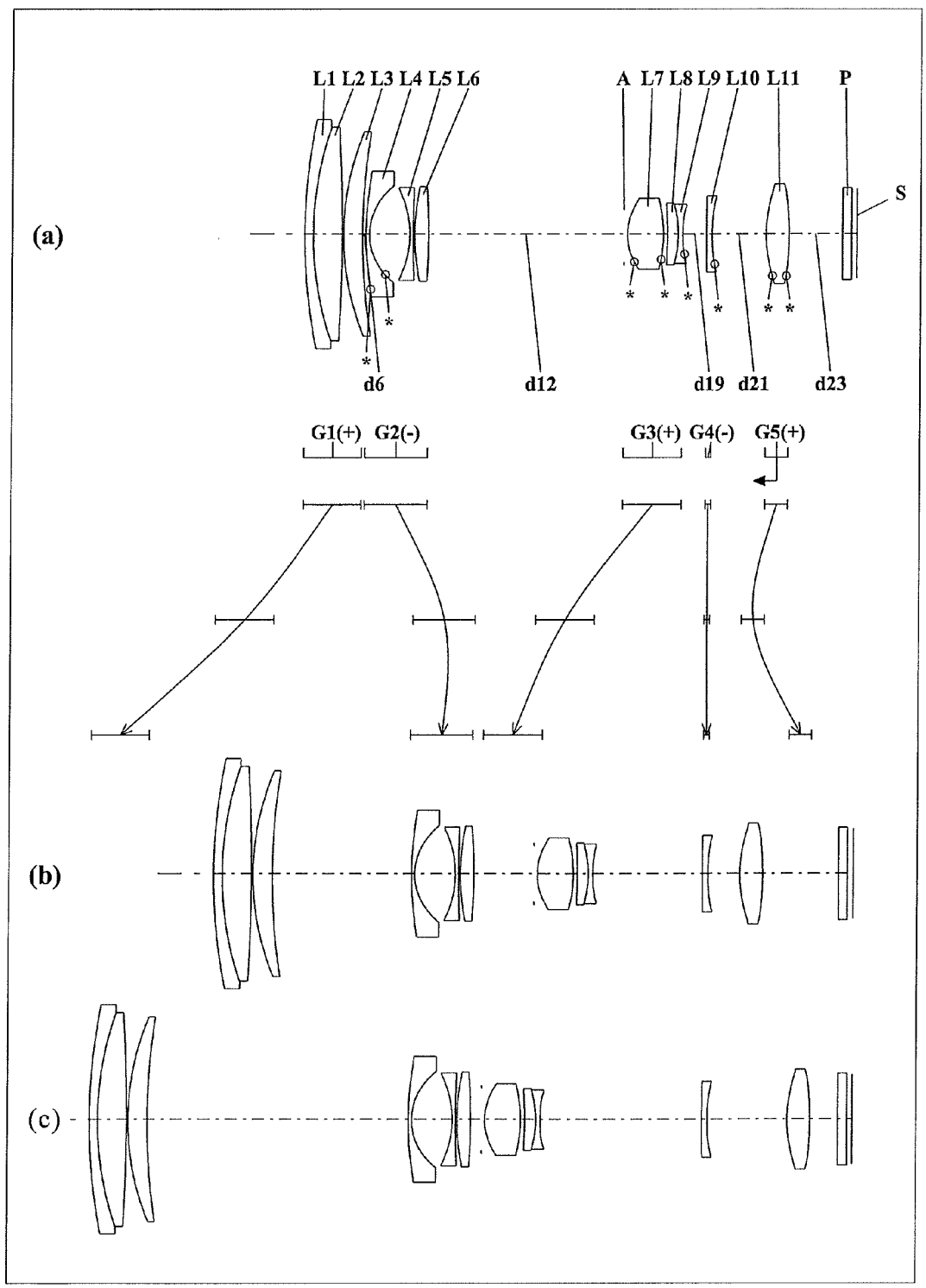
FIG. 10 is a lens arrangement diagram showing an infinity in-focus condition of a zoom lens system according to Embodiment 4 (Example 4)
Figure 11:
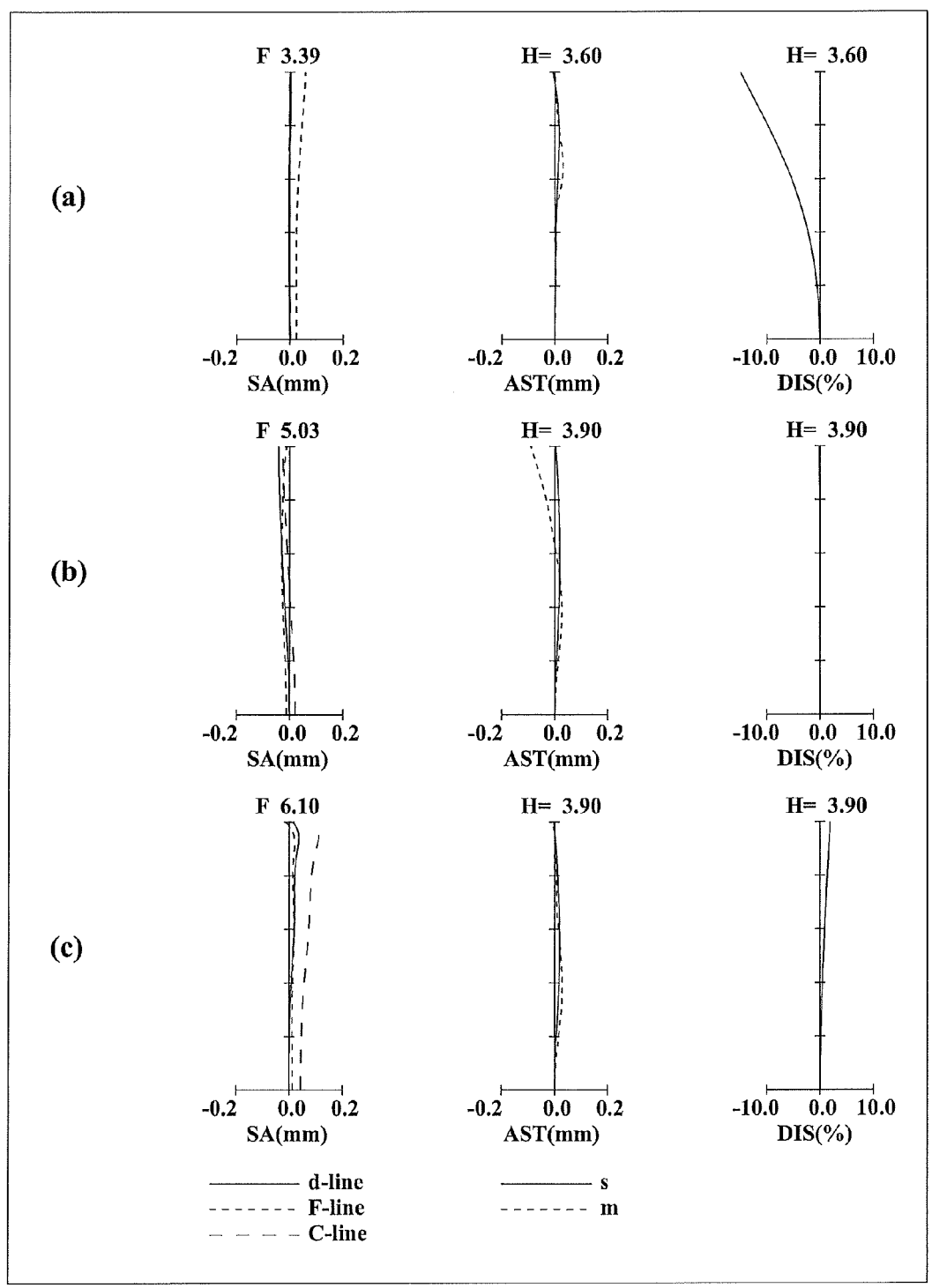
FIG. 11 is a longitudinal aberration diagram of an infinity in-focus condition of a zoom lens system according to Example 4.
Figure 12:
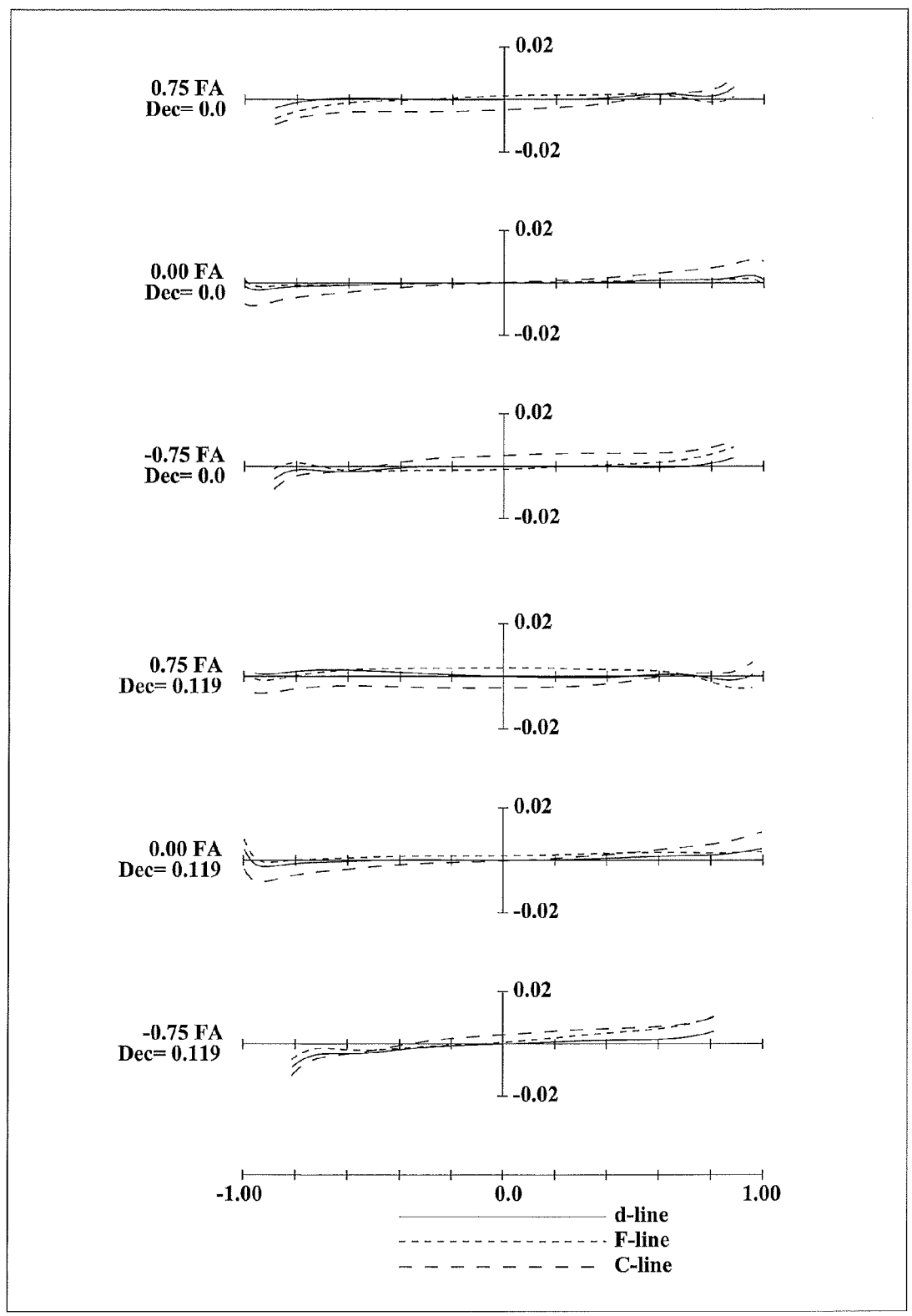
FIG. 12 is a lateral aberration diagram of a zoom lens system according to Example 4 at a telephoto limit in a basic state where image blur compensation is not performed and in a blur compensation state.

As shown in FIG. 10, in the zoom lens system according to Embodiment 4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data in the corresponding numerical example described later, surface number 2 indicates a cement layer between the first lens element L1 and the second lens element L2.

In the zoom lens system according to Embodiment 4, the second lens unit G2, in order from the object side to the image side, comprises: a negative meniscus fourth lens element L4 with the convex surface facing the object side; a bi-concave fifth lens element L5; and a bi-convex sixth lens element L6. Among these, the fourth lens element L4 has two aspheric surfaces.

In the zoom lens system according to Embodiment 4, the third lens unit G3, in order from the object side to the image side, comprises: a bi-convex seventh lens element L7; a positive meniscus eighth lens element L8 with the convex surface facing the image side; and a bi-concave ninth lens element L9. Among these, the eighth lens element L8 and the ninth lens element L9 are cemented with each other. In the surface data in the corresponding numerical example described later, surface number 17 indicates a cement layer between the eighth lens element L8 and the ninth lens element L9. The seventh lens element L7 has two aspheric surfaces, and the ninth lens element L9 has an aspheric image side surface.

In the zoom lens system according to Embodiment 4, the fourth lens unit G4 comprises solely a negative meniscus tenth lens element L10 with the convex surface facing the object side. The tenth lens element L10 has an aspheric image side surface.

In the zoom lens system according to Embodiment 4, the fifth lens unit G5 comprises solely a bi-convex eleventh lens element L11. The eleventh lens element L11 has two aspheric surfaces.

In the zoom lens system according to Embodiment 4, an aperture diaphragm A is provided on the object side relative to the third lens unit G3 (between the sixth lens element L6 and the seventh lens element L7), and a plane parallel plate P is provided on the object side relative to the image surface S (between the image surface S and the eleventh lens element L11).

In the zoom lens system according to Embodiment 4, in zooming from a wide-angle limit to a telephoto limit at the time of image taking, the first lens unit G1 and the third lens unit G3 move to the object side, the second lens unit G2 moves with locus of a convex to the image side so that the position of the second lens unit G2 at the telephoto limit is on the image side relative to the position at the wide-angle limit, the fifth lens unit G5 moves with locus of a convex to the object side so that the position of the fifth lens unit G5 at the telephoto limit is on the image side relative to the position at the wide-angle limit, and the fourth lens unit G4 is fixed relative to the image surface S. That is, in zooming, the individual lens units other than the fourth lens unit G4 move along the optical axis so that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should increase. Further, in zooming from a wide-angle limit to a telephoto limit at the time of image taking, the aperture diaphragm A moves integrally with the third lens unit G3 along the optical axis.

Further, in the zoom lens system according to Embodiment 4, in focusing from an infinity in-focus condition to a close-object in-focus condition, the fifth lens unit G5 moves to the object side along the optical axis.

Figure 13:
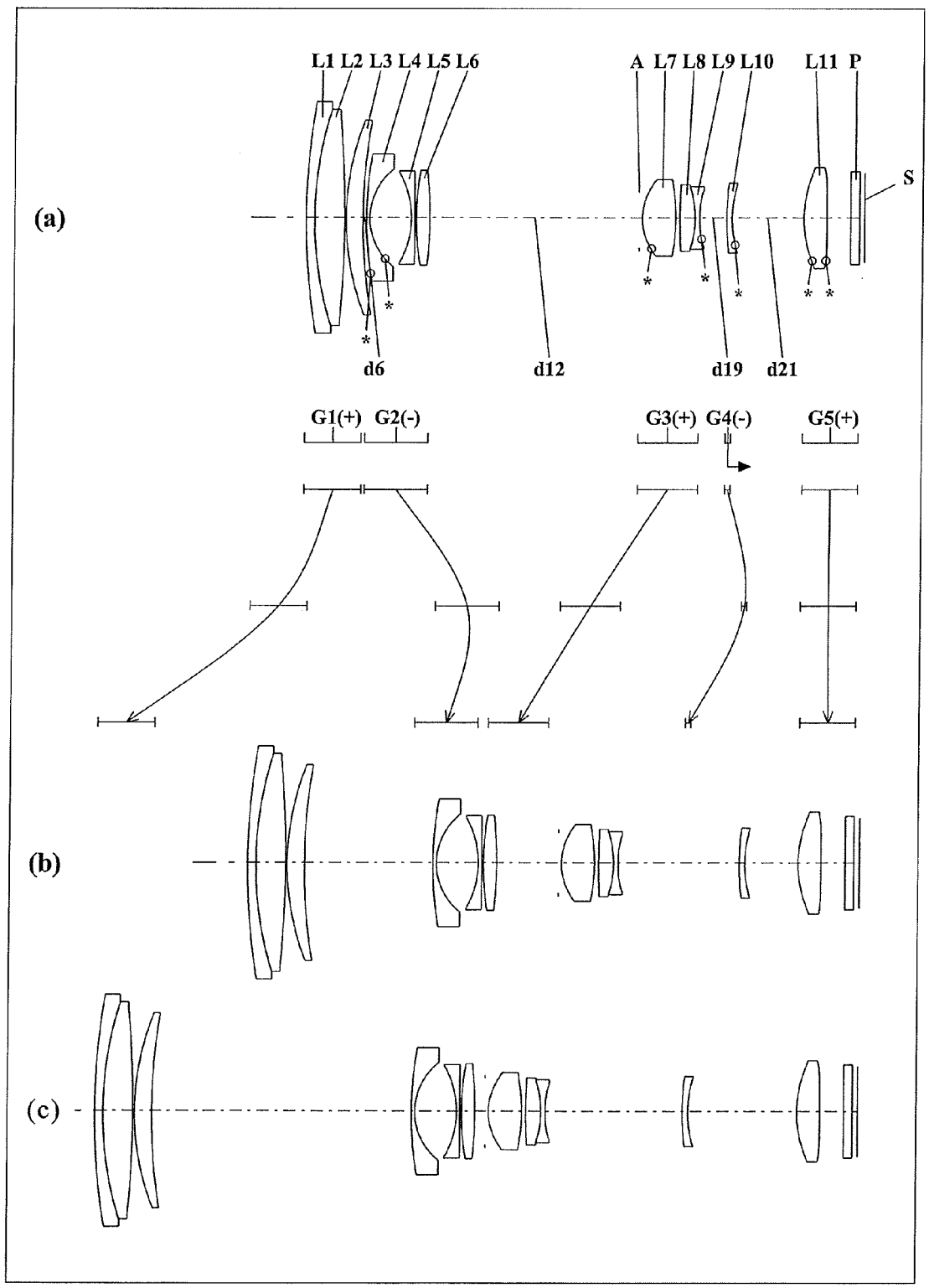
FIG. 13 is a lens arrangement diagram showing an infinity in-focus condition of a zoom lens system according to Embodiment 5 (Example 5)
Figure 14:
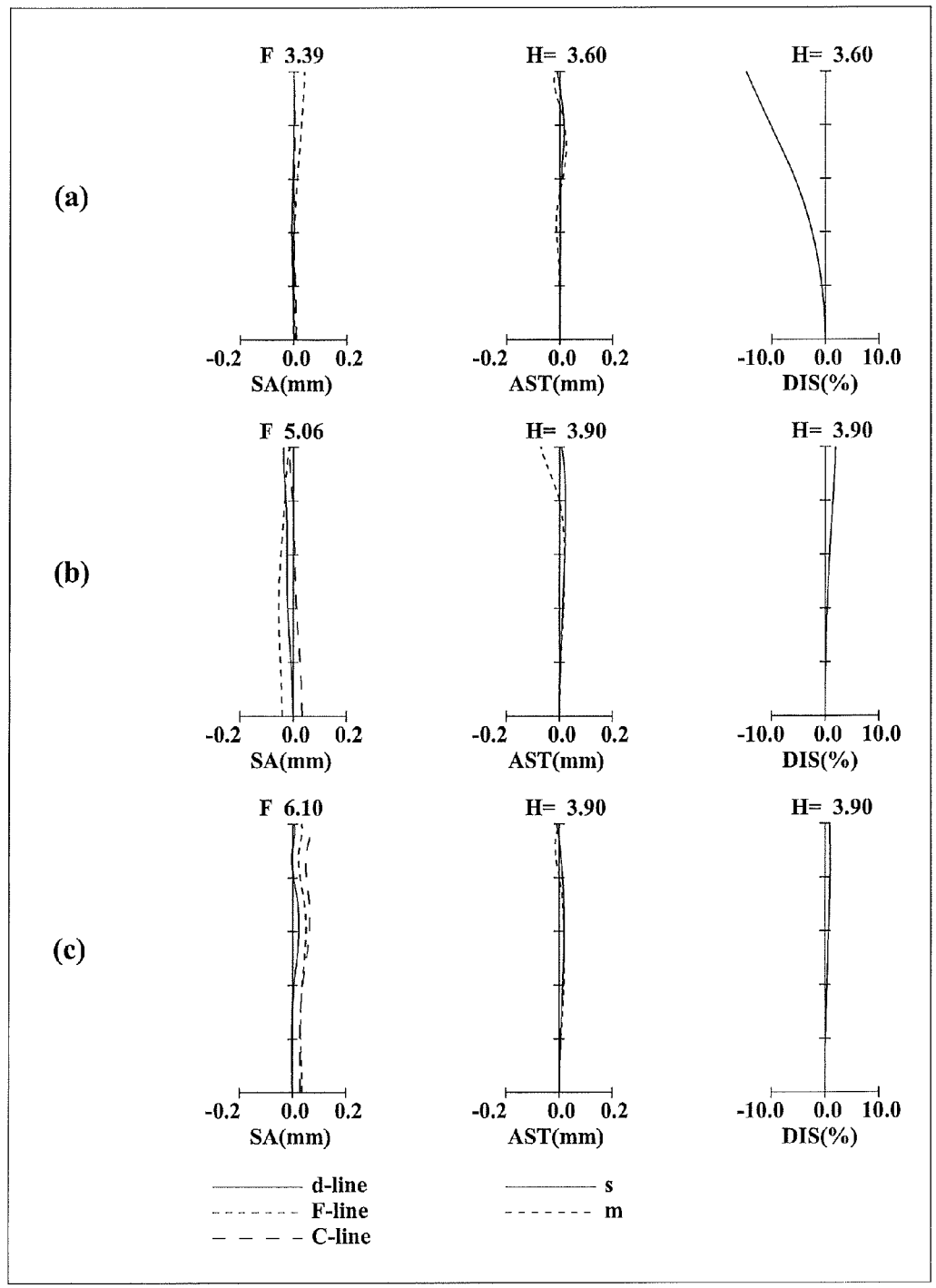
FIG. 14 is a longitudinal aberration diagram of an infinity in-focus condition of a zoom lens system according to Example 5.
Figure 15:
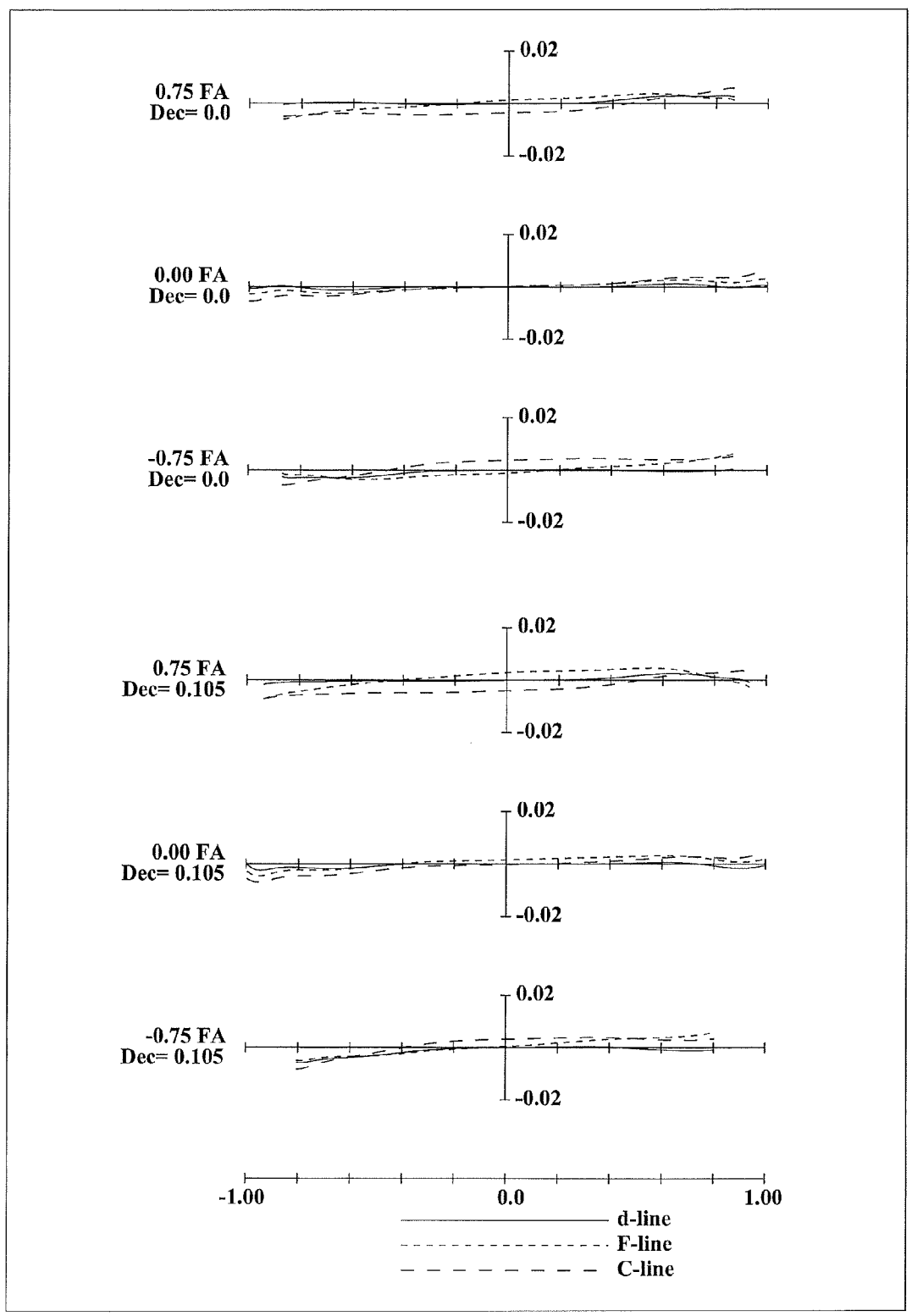
FIG. 15 is a lateral aberration diagram of a zoom lens system according to Example 5 at a telephoto limit in a basic state where image blur compensation is not performed and in a blur compensation state.

As shown in FIG. 13, in the zoom lens system according to Embodiment 5, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other. In the surface data in the corresponding numerical example described later, surface number 2 indicates a cement layer between the first lens element L1 and the second lens element L2.

In the zoom lens system according to Embodiment 5, the second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces.

In the zoom lens system according to Embodiment 5, the third lens unit G3, in order from the object side to the image side, comprises: a bi-convex seventh lens element L7; a bi-convex eighth lens element L8; and a bi-concave ninth lens element L9. Among these, the eighth lens element L8 and the ninth lens element L9 are cemented with each other. In the surface data in the corresponding numerical example described later, surface number 17 indicates a cement layer between the eighth lens element L8 and the ninth lens element L9. The seventh lens element L7 has an aspheric object side surface, and the ninth lens element L9 has an aspheric image side surface.

In the zoom lens system according to Embodiment 5, the fourth lens unit G4 comprises solely a negative meniscus tenth lens element L10 with the convex surface facing the object side. The tenth lens element L10 has an aspheric image side surface.

In the zoom lens system according to Embodiment 5, the fifth lens unit G5 comprises solely a positive meniscus eleventh lens element L11 with the convex surface facing the object side. The eleventh lens element L11 has two aspheric surfaces.

In the zoom lens system according to Embodiment 5, an aperture diaphragm A is provided on the object side relative to the third lens unit G3 (between the sixth lens element L6 and the seventh lens element L7), and a plane parallel plate P is provided on the object side relative to the image surface S (between the image surface S and the eleventh lens element L11).

In the zoom lens system according to Embodiment 5, in zooming from a wide-angle limit to a telephoto limit at the time of image taking, the first lens unit G1 and the third lens unit G3 move to the object side, the second lens unit G2 moves with locus of a convex to the image side so that the position of the second lens unit G2 at the telephoto limit is on the image side relative to the position at the wide-angle limit, the fourth lens unit G4 moves with locus of a convex to the image side so that the position of the fourth lens unit G4 at the telephoto limit is on the object side relative to the position at the wide-angle limit, and the fifth lens unit G5 is fixed relative to the image surface S. That is, in zooming, the individual lens units other than the fifth lens unit G5 move along the optical axis so that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should increase. Further, in zooming from a wide-angle limit to a telephoto limit at the time of image taking, the aperture diaphragm A moves integrally with the third lens unit G3 along the optical axis.

Further, in the zoom lens system according to Embodiment 5, in focusing from an infinity in-focus condition to a close-object in-focus condition, the fourth lens unit G4 moves to the image side along the optical axis.

Figure 16:
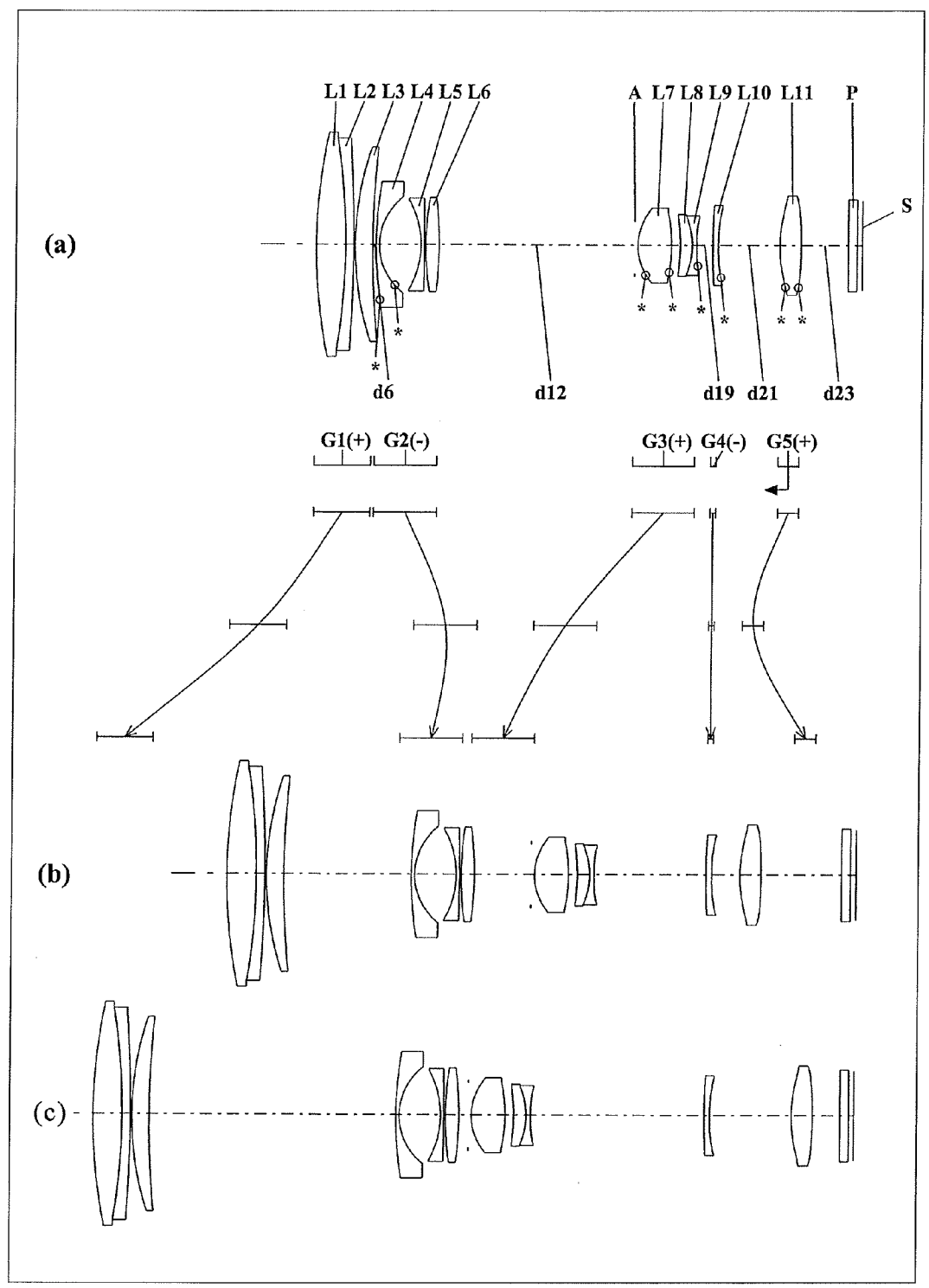
FIG. 16 is a lens arrangement diagram showing an infinity in-focus condition of a zoom lens system according to Embodiment 6 (Example 6)
Figure 17:
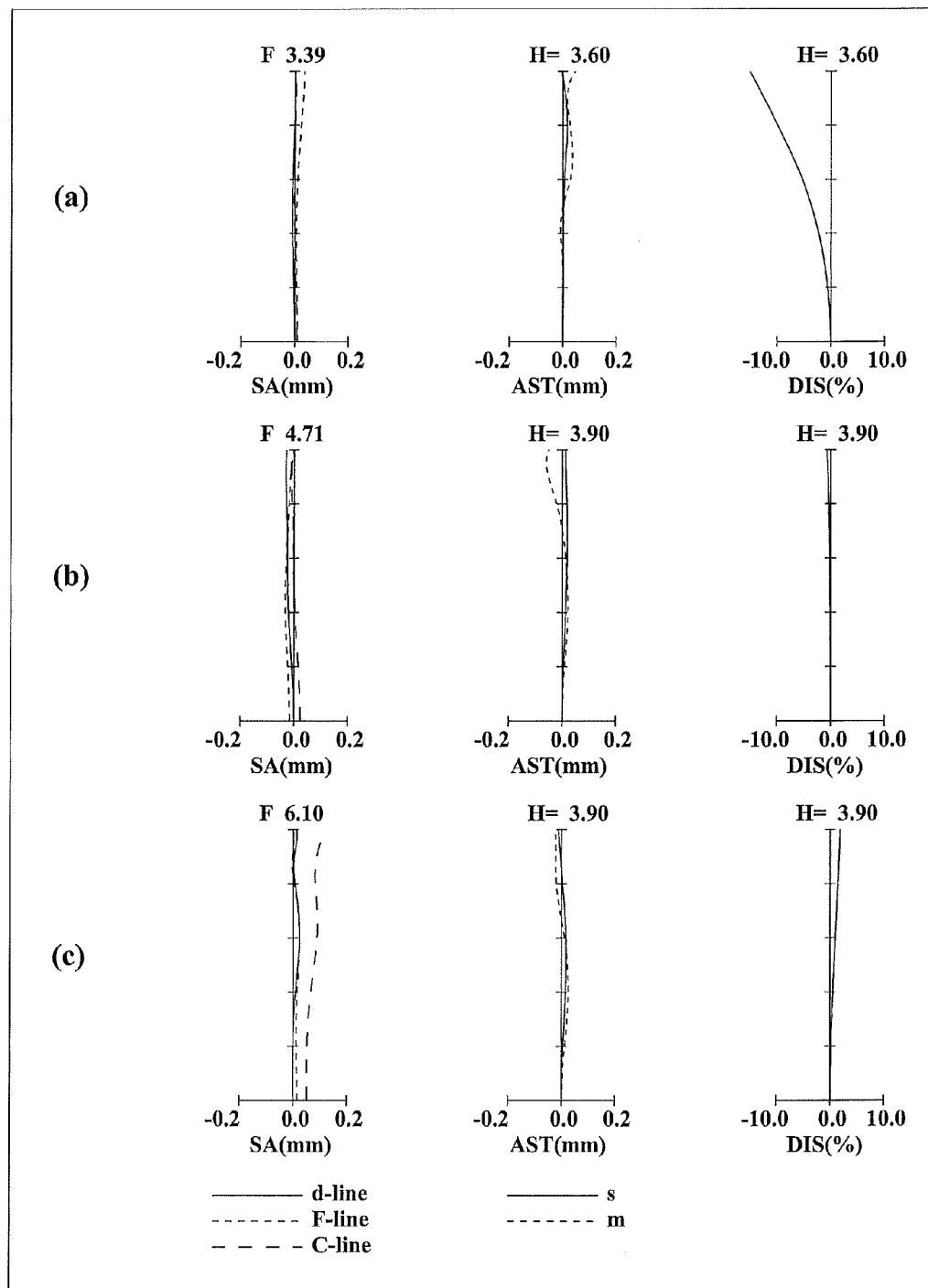
FIG. 17 is a longitudinal aberration diagram of an infinity in-focus condition of a zoom lens system according to Example 6.
Figure 18:
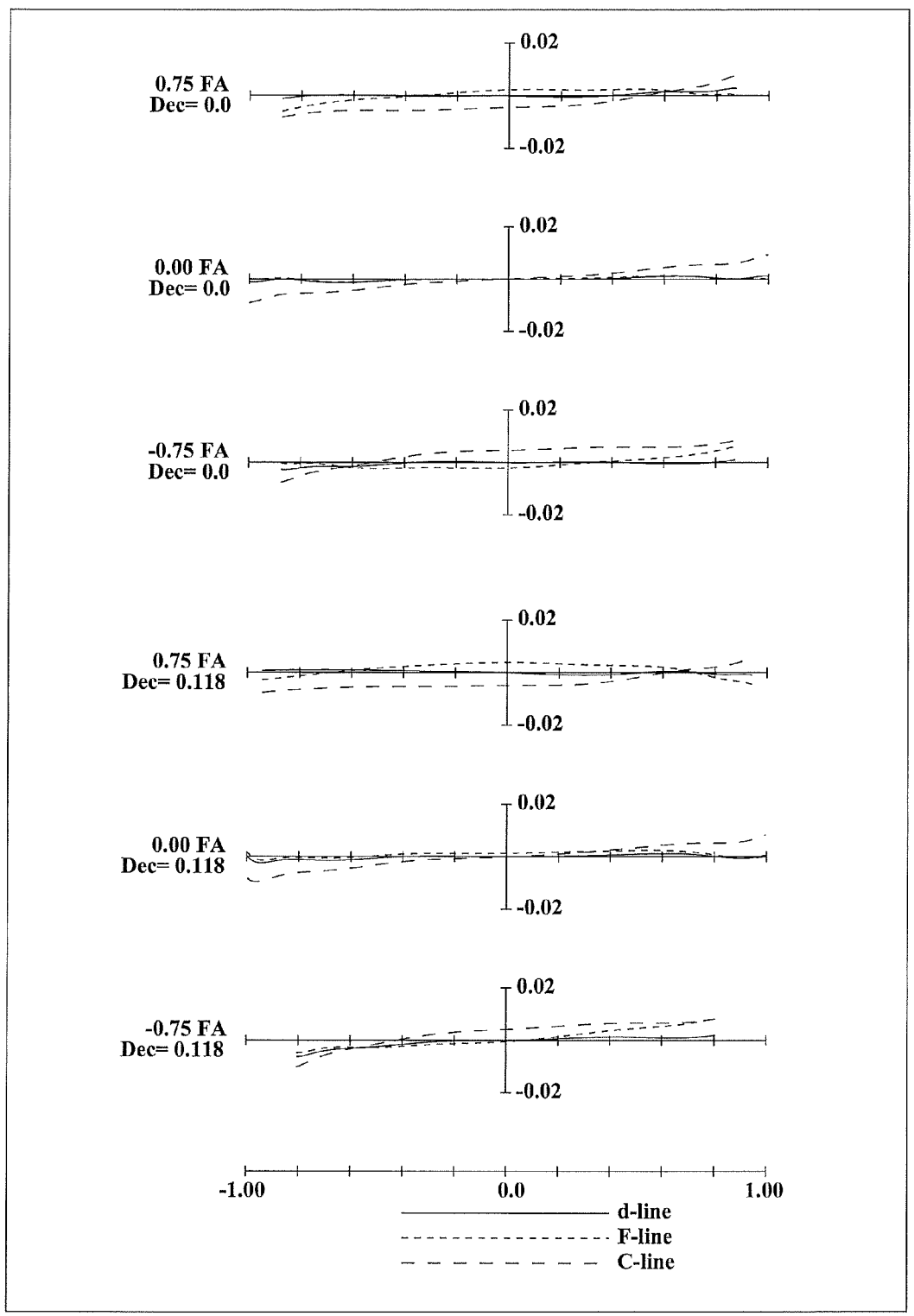
FIG. 18 is a lateral aberration diagram of a zoom lens system according to Example 6 at a telephoto limit in a basic state where image blur compensation is not performed and in a blur compensation state.

As shown in FIG. 16, in the zoom lens system according to Embodiment 6, the first lens unit G1, in order from the object side to the image side, comprises: a bi-convex first lens element L1; a negative meniscus second lens element L2 with the convex surface facing the image side; and a positive meniscus third lens element L3 with the convex surface facing the object side. Among these, the first lens element L1 and the second lens element L2 are cemented with each other. In the surface data in the corresponding numerical example described later, surface number 2 indicates a cement layer between the first lens element L1 and the second lens element L2.

In the zoom lens system according to Embodiment 6, the second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces.

In the zoom lens system according to Embodiment 6, the third lens unit G3, in order from the object side to the image side, comprises: a bi-convex seventh lens element L7; a positive meniscus eighth lens element L8 with the convex surface facing the image side; and a bi-concave ninth lens element L9. Among these, the eighth lens element L8 and the ninth lens element L9 are cemented with each other. In the surface data in the corresponding numerical example described later, surface number 17 indicates a cement layer between the eighth lens element L8 and the ninth lens element L9. The seventh lens element L7 has two aspheric surfaces, and the ninth lens element L9 has an aspheric image side surface.

In the zoom lens system according to Embodiment 6, the fourth lens unit G4 comprises solely a negative meniscus tenth lens element L10 with the convex surface facing the object side. The tenth lens element L10 has an aspheric image side surface.

In the zoom lens system according to Embodiment 6, the fifth lens unit G5 comprises solely a bi-convex eleventh lens element L11. The eleventh lens element L11 has two aspheric surfaces.

In the zoom lens system according to Embodiment 6, an aperture diaphragm A is provided on the object side relative to the third lens unit G3 (between the sixth lens element L6 and the seventh lens element L7), and a plane parallel plate P is provided on the object side relative to the image surface S (between the image surface S and the eleventh lens element L11).

In the zoom lens system according to Embodiment 6, in zooming from a wide-angle limit to a telephoto limit at the time of image taking, the first lens unit G1 and the third lens unit G3 move to the object side, the second lens unit G2 moves with locus of a convex to the image side so that the position of the second lens unit G2 at the telephoto limit is on the image side relative to the position at the wide-angle limit, the fifth lens unit G5 moves with locus of a convex to the object side so that the position of the fifth lens unit G5 at the telephoto limit is on the image side relative to the position at the wide-angle limit, and the fourth lens unit G4 is fixed relative to the image surface S. That is, in zooming, the individual lens units other than the fourth lens unit G4 move along the optical axis so that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should increase. Further, in zooming from a wide-angle limit to a telephoto limit at the time of image taking, the aperture diaphragm A moves integrally with the third lens unit G3 along the optical axis.

Further, in the zoom lens system according to Embodiment 6, in focusing from an infinity in-focus condition to a close-object in-focus condition, the fifth lens unit G5 moves to the object side along the optical axis.

In the zoom lens systems according to Embodiments 1 to 6, the third lens unit G3 includes at least one lens element having positive optical power and at least one lens element having negative optical power. Therefore, spherical aberration, coma aberration, and chromatic aberration can be favorably compensated.

In the zoom lens systems according to Embodiments 1 to 6, the fourth lens unit G4 is composed of one lens element, and the fifth lens unit G5 is also composed of one lens element. Therefore, the overall length of lens system is short.

In the zoom lens systems according to Embodiments 1 to 6, in focusing from an infinity in-focus condition to a close-object in-focus condition, the fourth lens unit G4 or the fifth lens unit G5, which is composed of one lens element and is positioned on the image side relative to the aperture diaphragm A, moves along the optical axis. Therefore, rapid focusing is easily achieved, and high optical performance is obtained particularly in the close-object in-focus condition. In addition, since the single lens element that moves along the optical axis in focusing has an aspheric surface, off-axial curvature of field from a wide-angle limit to a telephoto limit can be favorably compensated.

Particularly in the zoom lens system according to Embodiment 5, in focusing from an infinity in-focus condition to a close-object in-focus condition, the fourth lens unit G4 moves along the optical axis. Therefore, the amount of movement of the fourth lens unit G4 in focusing is reduced, which allows a lens barrel to be constructed compactly.

In the zoom lens systems according to Embodiments 1 to 6, in zooming from a wide-angle limit to a telephoto limit at the time of image taking, at least the first lens unit G1, the second lens unit G2, and the third lens unit G3, among the first lens unit G1 to the fifth lens unit G5, are individually moved along the optical axis so that zooming is achieved. Then, any lens unit among the first lens unit G1 to the fifth lens unit G5, or alternatively a sub lens unit consisting of a part of a lens unit is moved in a direction perpendicular to the optical axis, so that image point movement caused by vibration of the entire system is compensated, that is, image blur caused by hand blurring, vibration and the like can be compensated optically.

When image point movement caused by vibration of the entire system is to be compensated, for example, the third lens unit G3 is moved in a direction perpendicular to the optical axis. Thus, compensation of image blur can be performed in a state that size increase in the entire zoom lens system is suppressed and thereby a compact construction is realized and that excellent imaging characteristics such as small decentering coma aberration and small decentering astigmatism are maintained.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

The following description is given for conditions preferred to be satisfied by a zoom lens system like the zoom lens systems according to Embodiments 1 to 6. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect is obtained.

In a zoom lens system like the zoom lens systems according to Embodiments 1 to 6, which comprises, in order from the object side to the image side, a first lens unit having positive optical power, a second lens unit having negative optical power, a third lens unit having positive optical power, a fourth lens unit having negative optical power, and a fifth lens unit having positive optical power, in which the third lens unit includes at least one lens element having positive optical power and at least one lens element having negative optical power; in zooming from a wide-angle limit to a telephoto limit at the time of image taking, at least the first lens unit, the second lens unit, and the third lens unit are individually moved along the optical axis so that the air spaces between the respective lens units vary, thereby performing magnification change; and in focusing from an infinity in-focus condition to a close-object in-focus condition, the lens unit positioned on the image side relative to the aperture diaphragm is moved along the optical axis (this lens configuration is referred to as a basic configuration of the embodiment, hereinafter), the following conditions (1-2) and (a) are satisfied.

$$8.1 < f_{G1}/Ir < 10.4 \quad (1\text{-}2)$$

$$Z = f_T/f_W \geq 9.0 \quad (a)$$

where $f_{G1}$ is a composite focal length of the first lens unit,

Ir is a value represented by the following equation:

$$Ir = f_T \times \tan(\omega_T),$$

$\omega_T$ is a half view angle (°) at a telephoto limit, $f_T$ is a focal length of the entire system at a telephoto limit, and $f_W$ is a focal length of the entire system at a wide-angle limit.

The condition (1-2) sets forth the relationship between the focal length of the first lens unit and the maximum image height. When the value goes below the lower limit of the condition (1-2), the refractive power of the first lens unit is increased, which makes it difficult to compensate curvature of field that occurs in the first lens unit. Conversely, when the value exceeds the upper limit of the condition (1-2), the refractive power of the first lens unit is decreased, and the outer diameter of the first lens unit is increased to maintain achieving a wider angle, which makes it difficult to ensure compactness.

When at least one of the following conditions (1-2)' and (1-2)" is satisfied, the above-mentioned effect is achieved more successfully.

$$9.0 < f_{G1}/Ir \quad (1\text{-}2)'$$

$$f_{G1}/Ir < 10.3 \quad (1\text{-}2)''$$

It is preferable that the conditions (1-2), (1-2)', and (1-2)" are satisfied in the following condition (a)'.

$$Z = f_T/f_W \geq 9.3 \quad (a)'$$

In a zoom lens system having the basic configuration like the zoom lens systems according to Embodiments 1 to 6, it is preferable that the following condition (2) is satisfied.

$$28.8 < (L_{12T} - L_{12W}) \times f_{G1}/Ir^2 < 70.0 \quad (2)$$

where $L_{12T}$ is an interval between the first lens unit and the second lens unit at a telephoto limit, $L_{12W}$ is an interval between the first lens unit and the second lens unit at a wide-angle limit, $f_{G1}$ is a composite focal length of the first lens unit, Ir is a value represented by the following equation:

$$Ir = f_T \times \tan(\omega_T),$$

$\omega_T$ is a half view angle (°) at a telephoto limit, and $f_T$ is a focal length of the entire system at a telephoto limit.

The condition (2) sets forth the relationship between: the maximum image height; and a multiplier of an amount of change in the interval between the first lens unit and the second lens unit in zooming from a wide-angle limit to a telephoto limit at the time of image taking, and the focal length of the first lens unit. When the value goes below the lower limit of the condition (2), the amount of change in the interval between the first lens unit and the second lens unit in zooming becomes excessively small, which might make it difficult to obtain a high zooming ratio of 9 or more. Conversely, when the value exceeds the upper limit of the condition (2), the amount of change in the interval between the first lens unit and the second lens unit in zooming becomes excessively large, which might make it difficult to provide a compact lens barrel, imaging device, or camera. In addition, the focal length of the first lens unit is increased and thereby the amount of movement of the first lens unit, which is required for ensuring high magnification, becomes excessively large, which might make it difficult to provide a compact lens barrel, imaging device, or camera.

When at least one of the following conditions (2)' and (2)" is satisfied, the above-mentioned effect is achieved more successfully.

$$32.0 < (L_{12T} - L_{12T}) \times f_{G1}/Ir^2 \quad (2)'$$

$$(L_{12T} - L_{12W}) \times f_{G1}/Ir^2 < 65.0 \quad (2)''$$

It is preferable that the conditions (2), (2)', and (2)" are satisfied in the following condition (a)'.

$$Z = f_T/f_W \geq 9.3 \quad (a)'$$

In a zoom lens system having the basic configuration like the zoom lens systems according to Embodiments 1 to 6, it is preferable that the following condition (3) is satisfied.

$$1.85 < f_{G3}/D_{G3} < 4.29 \quad (3)$$

where $f_{G3}$ is a composite focal length of the third lens unit, and $D_{G3}$ is an optical axial thickness of the third lens unit.

The condition (3) sets forth the relationship between the focal length of the third lens unit and the optical axial thickness of the third lens unit. When the value goes below the lower limit of the condition (3), the optical axial thickness of the third lens unit becomes excessively large, which might make it difficult to ensure compactness. Conversely, when the value exceeds the upper limit of the condition (3), the focal length of the third lens unit becomes excessively long, which might make it difficult to maintain function of the third lens unit for magnification change. As a result, it might be difficult to configure a zoom lens system having a zooming ratio of 9 or more with the optical performance being maintained.

When at least one of the following conditions (3)' and (3)" is satisfied, the above-mentioned effect is achieved more successfully.

$$1.89 < f_{G3}/D_{G3} \quad (3)'$$

$$f_{G3}/D_{G3} < 3.8 \quad (3)''$$

It is preferable that the conditions (3), (3)', and (3)" are satisfied in the following condition (a)'.

$$Z = f_T/f_W \geq 9.3 \quad (a)'$$

In a zoom lens system having the basic configuration like the zoom lens systems according to Embodiments 1 to 6, it is preferable that the following condition (4) is satisfied.

$$-4.2 < f_{G1}/f_{G4} < -0.5 \quad (4)$$

where $f_{G1}$ is a composite focal length of the first lens unit, and $f_{G4}$ is a composite focal length of the fourth lens unit.

The condition (4) sets forth the ratio of the focal length of the first lens unit to the focal length of the fourth lens unit. When the value goes below the lower limit of the condition (4), the refractive power of the fourth lens unit is increased, which might make it difficult to compensate curvature of field that occurs in the fourth lens unit. Conversely, when the value exceeds the upper limit of the condition (4), the focal length of the fourth lens unit becomes excessively long, which might make it difficult to maintain function of the fourth lens unit for magnification change. As a result, it might be difficult to configure a zoom lens system having a zooming ratio of 9 more with the optical performance being maintained.

When at least one of the following conditions (4)' and (4)" is satisfied, the above-mentioned effect is achieved more successfully.

$$-3.7 < f_{G1}/f_{G4} \quad (4)'$$

$$f_{G1}/f_{G4} < -0.6 \quad (4)''$$

It is preferable that the conditions (4), (4)', and (4)" are satisfied in the following condition (a)'.

$$Z = f_T/f_W \geq 9.3 \quad (a)'$$

In a zoom lens system having the basic configuration like the zoom lens systems according to Embodiments 1 to 6, it is preferable that the following condition (5) is satisfied.

$$6.0 < f_{G1}/f_W < 9.4 \quad (5)$$

where $f_{G1}$ is a composite focal length of the first lens unit, and $f_W$ is a focal length of the entire system at a wide-angle limit.

The condition (5) sets forth an appropriate focal length of the first lens unit. When the value goes below the lower limit of the condition (5), the view angle at a wide-angle limit becomes excessively narrow, which contradicts the purpose of achieving a wider angle. Conversely, when the value exceeds the upper limit of the condition (5), the view angle at a wide-angle limit is increased. However, such increase in the view angle causes an increase in the outer diameter of the first lens unit, which might make it difficult to ensure compactness.

When at least one of the following conditions (5)' and (5)" is satisfied, the above-mentioned effect is achieved more successfully.

$$6.7 < f_{G1}/f_W \quad (5)'$$

$$f_{G1}/f_W < 8.4 \quad (5)''$$

It is preferable that the conditions (5), (5)', and (5)" are satisfied in the following condition (a)'.

$$Z = f_T/f_W \geq 9.3 \quad (a)'$$

In a zoom lens system having the basic configuration like the zoom lens systems according to Embodiments 1 to 6, it is preferable that the following condition (6) is satisfied.

$$4.3 < L_T/f_{G3} < 7.4 \quad (6)$$

where $L_T$ is an overall length of lens system at a telephoto limit (a distance from the most object side surface of the first lens unit to the image surface), and $f_{G3}$ is a composite focal length of the third lens unit.

The condition (6) sets forth the ratio of the overall length of the zoom lens system at a telephoto limit to the focal length of the third lens unit. When the value goes below the lower limit of the condition (6), the overall length of lens system becomes excessively short relative to the focal length of the third lens unit, which might make it difficult to ensure image surface characteristics and compensate various kinds of aberrations such as chromatic aberration. Conversely, when the value exceeds the upper limit of the condition (6), the overall length at a telephoto limit tends to increase, which might make it difficult to achieve a compact zoom lens system.

When at least one of the following conditions (6)' and (6)" is satisfied, the above-mentioned effect is achieved more successfully.

$$4.8 < L_T/f_{G3} \quad (6)'$$

$$L_T/f_{G3} < 7.0 \quad (6)''$$

It is preferable that the conditions (6), (6)', and (6)" are satisfied in the following condition (a)'.

$$Z = f_T/f_W \geq 9.3 \quad (a)'$$

Each of the lens units constituting the zoom lens system according to any of Embodiments 1 to 6 is composed exclusively of refractive type lens elements that deflect the incident light by refraction (that is, lens elements of a type in which deflection is achieved at the interface between media each having a distinct refractive index). However, the present invention is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fifth lens unit G5), a plane parallel plate P equivalent to an optical low-pass filter or a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment 7

Figure 19:
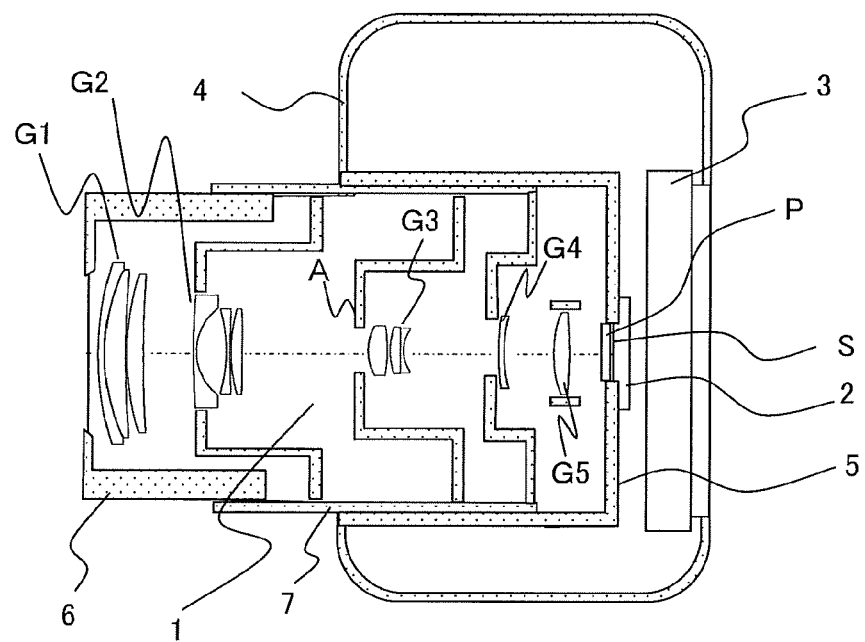
FIG. 19 is a schematic construction diagram of a digital still camera according to Embodiment 7.

FIG. 19 is a schematic construction diagram of a digital still camera according to Embodiment 7. In FIG. 19, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 19, the zoom lens system 1 comprises a first lens unit G1, a second lens unit G2, an aperture diaphragm A, a third lens unit G3, a fourth lens unit G4 and a fifth lens unit G5. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A and the third lens unit G3, the fourth lens unit G4, and the fifth lens unit G5 move to predetermined positions relative to the image sensor 2, so that zooming from a wide-angle limit to a telephoto limit is achieved. The fifth lens unit G5 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 19, any one of the zoom lens systems according to Embodiments 2 to 6 may be employed in place of the zoom lens system according to Embodiment 1. Further, the optical system of the digital still camera shown in FIG. 19 is applicable also to a digital video camera for moving images. In this case, moving images with high resolution can be acquired in addition to still images.

Here, the digital still camera according to the present Embodiment 7 has been described for a case that the employed zoom lens system 1 is a zoom lens system according to Embodiments 1 to 6. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 6.

Further, Embodiment 7 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 7, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel refraction.

An imaging device comprising a zoom lens system according to Embodiments 1 to 6, and an image sensor such as a CCD or a CMOS may be applied to a mobile telephone, a PDA (Personal Digital Assistance), a surveillance camera in a surveillance system, a Web camera, a vehicle-mounted camera or the like.

The following description is given for numerical examples in which the zoom lens system according to Embodiments 1 to 6 are implemented practically. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1-(1+\kappa)(h/r)^2}} + A4h^4 + A6h^6 + A8h^8 + A10h^{10} + A12h^{12} + A14h^{14}$$

Here, κ is the conic constant, A4, A6, A8, A10, A12, and A14 are a fourth-order, sixth-order, eighth-order, tenth-order, twelfth-order, and fourteenth-order aspherical coefficients, respectively.

FIGS. 2, 5, 8, 11, 14, and 17 are longitudinal aberration diagrams of the zoom lens systems according to Embodiments 1 to 6, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, and 18 are lateral aberration diagrams of the zoom lens systems at a telephoto limit according to Embodiments 1 to 6, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire third lens unit G3 is moved by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

Here, in the zoom lens system according to each example, the amount of movement of the third lens unit G3 in a direction perpendicular to the optical axis in an image blur compensation state at a telephoto limit is as follows.

Example 1 0.099 mm
Example 2 0.097 mm
Example 3 0.120 mm
Example 4 0.119 mm
Example 5 0.105 mm
Example 6 0.118 mm Here, when the shooting distance is infinity, at a telephoto limit, the amount of image decentering in a case that the zoom lens system inclines by 0.3° is equal to the amount of image decentering in a case that the entire third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +75% image point and the lateral aberration at the −75% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1 | 29.07890 | 0.65000 | 1.84666 | 23.8 |
| 2 | 19.24330 | 0.01000 | 1.56732 | 42.8 |
| 3 | 19.24330 | 2.11300 | 1.49700 | 81.6 |
| 4 | 86.42200 | 0.15000 | | |
| 5 | 25.67730 | 1.63400 | 1.77250 | 49.6 |
| 6 | 106.76530 | Variable | | |
| 7* | 42.46710 | 0.30000 | 1.84973 | 40.6 |
| 8* | 5.21720 | 3.24100 | | |
| 9* | −15.26730 | 0.40000 | 1.77200 | 50.0 |
| 10 | 76.30670 | 0.15000 | | |
| 11 | 17.04900 | 1.17960 | 1.94595 | 18.0 |
| 12 | −151.66660 | Variable | | |
| 13(Diaphragm) | ∞ | 0.40000 | | |
| 14* | 5.01370 | 2.06080 | 1.51776 | 69.9 |
| 15* | −14.83380 | 0.31080 | | |
| 16 | 7.54190 | 1.08750 | 1.69680 | 55.5 |
| 17 | −62.32080 | 0.01000 | 1.56732 | 42.8 |
| 18 | −62.32080 | 0.30000 | 1.68400 | 31.3 |
| 19* | 3.92740 | Variable | | |
| 20* | 23.41990 | 0.50000 | 1.68400 | 31.3 |
| 21 | 13.08220 | Variable | | |
| 22* | 16.98930 | 1.65270 | 1.58332 | 59.1 |
| 23* | −26.72840 | Variable | | |
| 24 | ∞ | 0.78000 | 1.51680 | 64.2 |
| 25 | ∞ | (BF) | | |
| Image surface | ∞ | | | |

TABLE 2

(Aspherical data)

Surface No. 7

K = 0.00000E+00, A4 = −9.72329E−04, A6 = 6.36526E−05, A8 = −1.99584E−06
A10 = 2.92580E−08, A12 = −1.63083E−10, A14 = 0.00000E+00

Surface No. 8

K = 0.00000E+00, A4 = −1.22093E−03, A6 = 2.19405E−05, A8 = 1.40953E−06
A10 = −3.56942E−08, A12 = −2.36435E−09, A14 = 0.00000E+00

Surface No. 9

K = 0.00000E+00, A4 = 5.93781E−05, A6 = −2.69846E−06, A8 = 3.46597E−07
A10 = −6.62230E−09, A12 = 0.00000E+00, A14 = 0.00000E+00

Surface No. 14

K = 0.00000E+00, A4 = −7.54870E−04, A6 = −1.40572E−05, A8 = −1.04531E−05
A10 = 2.38177E−06, A12 = −2.87275E−07, A14 = 1.38097E−08

Surface No. 15

K = 0.00000E+00, A4 = 5.09922E−04, A6 = −5.84241E−05, A8 = 5.40285E−06
A10 = −2.75892E−07, A12 = −1.85138E−08, A14 = 3.34187E−09

Surface No. 19

K = 0.00000E+00, A4 = 4.20574E−04, A6 = 8.24211E−05, A8 = −7.95809E−07
A10 = −2.57510E−07, A12 = 0.00000E+00, A14 = 0.00000E+00

Surface No. 20

K = 0.00000E+00, A4 = −2.19857E−04, A6 = 3.63458E−06, A8 = 4.00573E−07
A10 = −2.82320E−08, A12 = 0.00000E+00, A14 = 0.00000E+00

Surface No. 22

K = 0.00000E+00, A4 = 1.05194E−03, A6 = −7.57016E−05, A8 = 5.38661E−06
A10 = −1.94121E−07, A12 = 3.02762E−09, A14 = 0.00000E+00

Surface No. 23

K = 0.00000E+00, A4 = 1.08119E−03, A6 = −8.90636E−05, A8 = 5.62747E−06
A10 = −1.80010E−07, A12 = 2.44837E−09, A14 = 0.00000E+00

TABLE 3

(Various data)

Zooming ratio 9.39629

| | Wide-angle limit | Middle position | Telephoto limit |
|---|---|---|---|
| Focal length | 4.6443 | 14.2342 | 43.6394 |
| F-number | 3.22092 | 4.84786 | 6.12992 |
| View angle | 42.0584 | 15.0863 | 5.0098 |
| Image height | 3.6500 | 3.9020 | 3.9020 |
| Overall length of lens system | 42.9083 | 47.1490 | 56.1347 |
| BF | 0.78233 | 0.75528 | 0.75942 |
| d6 | 0.3000 | 7.7704 | 17.9496 |
| d12 | 16.1182 | 5.8225 | 0.4933 |
| d19 | 1.5052 | 8.5986 | 12.7301 |
| d21 | 2.2602 | 3.0078 | 4.6579 |
| d23 | 5.0130 | 4.2650 | 2.6150 |
| Entrance pupil position | 10.7315 | 24.1995 | 65.6340 |
| Exit pupil position | −15.8295 | −42.6408 | −164.1662 |
| Front principal points position | 14.0774 | 33.7648 | 97.7264 |
| Back principal points position | 38.2640 | 32.9148 | 12.4953 |

Single lens data

| Lens element | Initial surface number | Focal length |
|---|---|---|
| 1 | 1 | −69.2960 |
| 2 | 3 | 49.2954 |
| 3 | 5 | 43.3837 |
| 4 | 7 | −7.0258 |
| 5 | 9 | −16.4479 |
| 6 | 11 | 16.2572 |
| 7 | 14 | 7.5031 |
| 8 | 16 | 9.7173 |
| 9 | 18 | −5.3915 |
| 10 | 20 | −44.1980 |
| 11 | 22 | 18.0582 |

Zoom lens unit data

| Lens unit | Initial surface No. | Focal length | Overall length of lens unit | Front principal points position | Back principal points position |
|---|---|---|---|---|---|
| 1 | 1 | 35.71662 | 4.55700 | 0.75324 | 2.45072 |
| 2 | 7 | −7.37411 | 5.27060 | −0.04845 | 0.62571 |
| 3 | 13 | 10.35837 | 4.16910 | −1.69622 | 0.50121 |
| 4 | 20 | −44.19800 | 0.50000 | 0.68613 | 0.88327 |
| 5 | 22 | 18.05824 | 1.65270 | 0.41137 | 1.00551 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.28379 | −0.39829 | −0.88471 |
| 3 | 13 | −0.56992 | −1.18735 | −1.48366 |
| 4 | 20 | 1.30781 | 1.28135 | 1.24307 |
| 5 | 22 | 0.61476 | 0.65768 | 0.74882 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 18.14520 | 0.65000 | 1.84666 | 23.8 |
| 2 | 13.33980 | 0.01000 | 1.56732 | 42.8 |
| 3 | 13.33980 | 3.26860 | 1.58332 | 59.1 |
| 4* | −589.95180 | Variable | | |
| 5* | 87.44040 | 0.30000 | 1.84973 | 40.6 |
| 6* | 5.37010 | 2.99770 | | |
| 7* | −26.69530 | 0.40000 | 1.77200 | 50.0 |
| 8 | 28.62040 | 0.15000 | | |
| 9 | 12.92880 | 1.20490 | 1.94595 | 18.0 |
| 10 | 77.42510 | Variable | | |
| 11(Diaphragm) | ∞ | 0.40000 | | |
| 12* | 4.78090 | 1.97140 | 1.51776 | 69.9 |
| 13* | −21.67480 | 0.38050 | | |
| 14 | 8.27620 | 1.04910 | 1.69680 | 55.5 |
| 15 | −36.81240 | 0.01000 | 1.56732 | 42.8 |
| 16 | −36.81240 | 0.30000 | 1.68400 | 31.3 |
| 17* | 4.49740 | Variable | | |
| 18* | 38.62140 | 0.50000 | 1.68400 | 31.3 |
| 19 | 19.55510 | Variable | | |
| 20* | 28.67580 | 1.35530 | 1.58332 | 59.1 |
| 21* | −20.57080 | Variable | | |
| 22 | ∞ | 0.78000 | 1.51680 | 64.2 |
| 23 | ∞ | (BF) | | |
| Image surface | ∞ | | | |

TABLE 5

(Aspherical data)

Surface No. 4

K = 0.00000E+00, A4 = 7.09435E−06, A6 = 1.39413E−08,
A8 = −3.55887E−10 A10 = 1.79420E−12, A12 = 0.00000E+00,
A14 = 0.00000E+00

Surface No. 5

K = 0.00000E+00, A4 = −9.04835E−04, A6 = 6.38967E−05,
A8 = −1.99616E−06 A10 = 2.89852E−08, A12 = −1.62345E−10,
A14 = 0.00000E+00

Surface No. 6

K = 0.00000E+00, A4 = −1.12009E−03, A6 = 1.90764E−05,
A8 = 2.12713E−06 A10 = −6.28475E−08, A12 = −1.45269E−09,
A14 = 0.00000E+00

Surface No. 7

K = 0.00000E+00, A4 = 3.91664E−05, A6 = −3.88322E−06,
A8 = 4.36023E−07 A10 = −6.37301E−09, A12 = 0.00000E+00,
A14 = 0.00000E+00

Surface No. 12

K = 0.00000E+00, A4 = −4.60614E−04, A6 = −1.66676E−05,
A8 = −6.31506E−06 A10 = 2.29012E−06, A12 = −2.84467E−07,
A14 = 1.58823E−08

Surface No. 13

K = 0.00000E+00, A4 = 2.37830E−04, A6 = −2.99392E−05,
A8 = 1.26348E−05 A10 = −1.02151E−06, A12 = 6.60245E−08,
A14 = 1.78751E−09

Surface No. 17

K = 0.00000E+00, A4 = 1.55075E−03, A6 = 1.22167E−04,
A8 = −6.78885E−06 A10 = 9.45007E−07, A12 = 0.00000E+00,
A14 = 0.00000E+00

TABLE 5-continued (Aspherical data)

Surface No. 18

K = 0.00000E+00, A4 = −2.46048E−04, A6 = 1.29409E−05,
A8 = 2.04153E−08 A10 = −1.93577E−08, A12 = 0.00000E+00,
A14 = 0.00000E+00

Surface No. 20

K = 0.00000E+00, A4 = 1.37841E−03, A6 = −8.95310E−05,
A8 = 5.88917E−06 A10 = −2.03229E−07, A12 = 2.85975E−09,
A14 = 0.00000E+00

Surface No. 21

K = 0.00000E+00, A4 = 1.41685E−03, A6 = −9.96748E−05,
A8 = 6.44922E−06 A10 = −2.09304E−07, A12 = 2.51268E−09,
A14 = 0.00000E+00

TABLE 6

(Various data)

Zooming ratio 9.39396

| | Wide-angle limit | Middle position | Telephoto limit |
|---|---|---|---|
| Focal length | 4.6471 | 14.2377 | 43.6544 |
| F-number | 3.20754 | 4.74466 | 6.12716 |
| View angle | 42.4452 | 15.0755 | 5.0085 |
| Image height | 3.6500 | 3.9020 | 3.9020 |
| Overall length of lens system | 41.9901 | 45.2884 | 54.5886 |
| BF | 0.79321 | 0.77325 | 0.75869 |
| d4 | 0.3000 | 7.4082 | 17.3332 |
| d10 | 16.2859 | 5.5822 | 0.6079 |
| d17 | 1.5000 | 8.4137 | 12.7778 |
| d19 | 2.3798 | 2.4889 | 4.8495 |
| d21 | 5.0037 | 4.8946 | 2.5340 |
| Entrance pupil position | 10.5237 | 23.3494 | 63.6707 |
| Exit pupil position | −15.6608 | −35.0905 | −111.1803 |
| Front principal points position | 13.8583 | 31.9349 | 90.3006 |
| Back principal points position | 37.3430 | 31.0506 | 10.9342 |

Single lens data

| Lens element | Initial surface number | Focal length |
|---|---|---|
| 1 | 1 | −63.4272 |
| 2 | 3 | 22.4078 |
| 3 | 5 | −6.7446 |
| 4 | 7 | −17.8353 |
| 5 | 9 | 16.2597 |
| 6 | 12 | 7.7625 |
| 7 | 14 | 9.7908 |
| 8 | 16 | −5.8421 |
| 9 | 18 | −58.5351 |
| 10 | 20 | 20.7448 |

Zoom lens unit data

| Lens unit | Initial surface No. | Focal length | Overall length of lens unit | Front principal points position | Back principal points position |
|---|---|---|---|---|---|
| 1 | 1 | 35.51130 | 3.92860 | −0.16091 | 1.34227 |
| 2 | 5 | −7.23013 | 5.05260 | −0.02336 | 0.75890 |
| 3 | 11 | 10.19153 | 4.11100 | −1.46087 | 0.56501 |
| 4 | 18 | −58.53509 | 0.50000 | 0.60791 | 0.80780 |
| 5 | 20 | 20.74481 | 1.35530 | 0.50354 | 0.99408 |

TABLE 6-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.28445 | −0.39487 | −0.86227 |
| 3 | 11 | −0.55955 | −1.22662 | −1.51803 |
| 4 | 18 | 1.21204 | 1.20915 | 1.17530 |
| 5 | 20 | 0.67836 | 0.68458 | 0.79908 |

Numerical Example 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | | | |
| 1 | 57.34670 | 0.75000 | 1.84666 | 23.8 |
| 2 | 30.67210 | 0.01000 | 1.56732 | 42.8 |
| 3 | 30.67210 | 2.81960 | 1.49700 | 81.6 |
| 4 | −136.79070 | 0.15000 | | |
| 5 | 23.79550 | 1.86930 | 1.72916 | 54.7 |
| 6 | 58.21050 | Variable | | |
| 7* | 33.55860 | 0.30000 | 1.85135 | 40.1 |
| 8* | 5.35170 | 3.43870 | | |
| 9 | −10.82510 | 0.30000 | 1.71300 | 53.9 |
| 10 | 34.17370 | 0.16990 | | |
| 11 | 15.57610 | 1.26730 | 1.94595 | 18.0 |
| 12 | −503.66630 | Variable | | |
| 13(Diaphragm) | ∞ | Variable | | |
| 14* | 5.26740 | 3.19670 | 1.52501 | 70.3 |
| 15* | −10.92320 | 0.30000 | | |
| 16 | −50.00000 | 0.83700 | 1.69680 | 55.5 |
| 17 | −11.86390 | 0.01000 | 1.56732 | 42.8 |
| 18 | −11.86390 | 0.40000 | 1.68400 | 31.3 |
| 19* | 15.91570 | Variable | | |
| 20 | 121.62680 | 0.50000 | 1.68400 | 31.3 |
| 21* | 11.25930 | Variable | | |
| 22* | 10.78660 | 2.26080 | 1.52501 | 70.3 |
| 23* | −35.76060 | Variable | | |
| 24 | ∞ | 0.78000 | 1.51680 | 64.2 |
| 25 | ∞ | (BF) | | |
| Image surface | ∞ | | | |

TABLE 8

(Aspherical data)

Surface No. 7

K = 0.00000E+00, A4 = −8.16586E−05, A6 = 4.93525E−07,
A8 = −4.71059E−08 A10 = 6.04514E−10, A12 = 0.00000E+00
Surface No. 8

K = 0.00000E+00, A4 = −1.06644E−04, A6 = −1.32278E−05,
A8 = 9.85494E−07 A10 = −4.27628E−08, A12 = 0.00000E+00
Surface No. 14

K = 0.00000E+00, A4 = −2.98911E−04, A6 = −2.76757E−05,
A8 = 6.05740E−08 A10 = −2.69111E−07, A12 = 0.00000E+00
Surface No. 15

K = 0.00000E+00, A4 = 1.43528E−04, A6 = −5.06916E−05,
A8 = −1.94110E−06 A10 = 0.00000E+00, A12 = 0.00000E+00

TABLE 8-continued (Aspherical data)

Surface No. 19

K = 0.00000E+00, A4 = 1.53349E−03, A6 = 9.73212E−05,
A8 = 4.19851E−06 A10 = 1.71434E−08, A12 = 0.00000E+00
Surface No. 21

K = 0.00000E+00, A4 = 4.32105E−05, A6 = 8.58735E−06,
A8 = −1.29261E−06 A10 = 5.75642E−08, A12 = 0.00000E+00
Surface No. 22

K = 0.00000E+00, A4 = −6.24838E−04, A6 = 4.67785E−05,
A8 = −3.02859E−06 A10 = 9.39984E−08, A12 = −1.86680E−09
Surface No. 23

K = 0.00000E+00, A4 = −6.58830E−04, A6 = 2.90740E−05,
A8 = −9.01156E−07 A10 = −8.78842E−09, A12 = 0.00000E+00

TABLE 9

(Various data)

Zooming ratio 15.16109

| | Wide-angle limit | Middle position | Telephoto limit |
|---|---|---|---|
| Focal length | 4.6500 | 18.6001 | 70.4998 |
| F-number | 3.39030 | 4.68745 | 6.12369 |
| View angle | 42.3265 | 11.9014 | 3.1099 |
| Image height | 3.6000 | 3.9020 | 3.9020 |
| Overall length of lens system | 52.8441 | 58.5746 | 69.1106 |
| BF | 0.47960 | 0.51207 | 0.46063 |
| d6 | 0.3000 | 13.2756 | 24.3919 |
| d12 | 18.4975 | 5.6765 | 1.1483 |
| d13 | 1.8191 | 0.3000 | 0.3000 |
| d19 | 3.1757 | 8.3407 | 11.9271 |
| d21 | 6.4917 | 3.5318 | 7.9963 |
| d23 | 2.7212 | 7.5786 | 3.5271 |
| Entrance pupil position | 11.0954 | 40.7684 | 124.6419 |
| Exit pupil position | −61.3743 | −44.3322 | 439.7759 |
| Front principal points position | 15.3959 | 51.6537 | 206.4552 |
| Back principal points position | 48.1940 | 39.9745 | −1.3892 |

Single lens data

| Lens element | Initial surface number | Focal length |
|---|---|---|
| 1 | 1 | −78.9002 |
| 2 | 3 | 50.6947 |
| 3 | 5 | 53.9623 |
| 4 | 7 | −7.5156 |
| 5 | 9 | −11.4982 |
| 6 | 11 | 15.9912 |
| 7 | 14 | 7.2626 |
| 8 | 16 | 22.1235 |
| 9 | 18 | −9.8796 |
| 10 | 20 | −18.1737 |
| 11 | 22 | 16.0530 |

Zoom lens unit data

| Lens unit | Initial surface No. | Focal length | Overall length of lens unit | Front principal points position | Back principal points position |
|---|---|---|---|---|---|
| 1 | 1 | 39.37702 | 5.59890 | 1.40650 | 3.47976 |
| 2 | 7 | −6.11720 | 5.47590 | 0.54923 | 1.52332 |
| 3 | 14 | 10.01883 | 4.74370 | −0.60520 | 1.29457 |
| 4 | 20 | −18.17370 | 0.50000 | 0.32781 | 0.53035 |
| 5 | 22 | 16.05298 | 2.26080 | 0.34939 | 1.10249 |

TABLE 9-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.20194 | −0.35327 | −0.98672 |
| 3 | 14 | −0.47714 | −1.32117 | −1.44572 |
| 4 | 20 | 1.75980 | 2.58300 | 1.93863 |
| 5 | 22 | 0.69642 | 0.39181 | 0.64740 |

Numerical Example 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1 | 51.53350 | 0.75000 | 1.84666 | 23.8 |
| 2 | 28.69750 | 0.01000 | 1.56732 | 42.8 |
| 3 | 28.69750 | 2.62020 | 1.49700 | 81.6 |
| 4 | −167.00710 | 0.15000 | | |
| 5 | 23.56150 | 1.72340 | 1.72916 | 54.7 |
| 6 | 57.34580 | Variable | | |
| 7* | 26.00400 | 0.30000 | 1.85135 | 40.1 |
| 8* | 5.07260 | 3.67090 | | |
| 9 | −8.86200 | 0.30000 | 1.71300 | 53.9 |
| 10 | 102.89120 | 0.15000 | | |
| 11 | 20.30160 | 1.23410 | 1.94595 | 18.0 |
| 12 | −54.48290 | Variable | | |
| 13(Diaphragm) | ∞ | 0.30000 | | |
| 14* | 5.10950 | 3.26090 | 1.52501 | 70.3 |
| 15* | −12.43940 | 0.36260 | | |
| 16 | −50.00790 | 0.99390 | 1.69680 | 55.5 |
| 17 | −9.43060 | 0.01000 | 1.56732 | 42.8 |
| 18 | −9.43060 | 0.40000 | 1.68400 | 31.3 |
| 19* | 14.51400 | Variable | | |
| 20 | 213.31420 | 0.50000 | 1.68400 | 31.3 |
| 21* | 15.00360 | Variable | | |
| 22* | 11.52200 | 2.05250 | 1.52501 | 70.3 |
| 23* | −42.70170 | Variable | | |
| 24 | ∞ | 0.78000 | 1.51680 | 64.2 |
| 25 | ∞ | (BF) | | |
| Image surface | ∞ | | | |

TABLE 11

(Aspherical data)

Surface No. 7

K = 0.00000E+00, A4 = −1.29016E−04, A6 = 2.90190E−06,
A8 = −1.12455E−07 A10 = 1.26618E−09, A12 = 0.00000E+00
Surface No. 8

K = 0.00000E+00, A4 = −2.58730E−04, A6 = −1.88614E−05,
A8 = 1.55667E−06 A10 = −7.93547E−08, A12 = 0.00000E+00
Surface No. 14

K = 0.00000E+00, A4 = −3.22933E−04, A6 = −2.40404E−05,
A8 = −2.72257E−08 A10 = −1.34244E−07, A12 = 0.00000E+00
Surface No. 15

K = 0.00000E+00, A4 = 2.34703E−06, A6 = −2.88793E−05,
A8 = −4.99722E−07 A10 = 0.00000E+00, A12 = 0.00000E+00

TABLE 11-continued (Aspherical data)

Surface No. 19

K = 0.00000E+00, A4 = 1.82516E−03, A6 = 8.73655E−05,
A8 = 3.90359E−06 A10 = 4.73697E−08, A12 = 0.00000E+00
Surface No. 21

K = 0.00000E+00, A4 = 2.72307E−05, A6 = 6.25910E−06,
A8 = −5.88975E−07 A10 = 2.38168E−08, A12 = 0.00000E+00
Surface No. 22

K = 0.00000E+00, A4 = −6.01980E−04, A6 = 4.78200E−05,
A8 = −2.82173E−06 A10 = 8.19441E−08, A12 = −1.60425E−09
Surface No. 23

K = 0.00000E+00, A4 = −6.54335E−04, A6 = 3.22551E−05,
A8 = −1.06168E−06 A10 = −5.39506E−09, A12 = 0.00000E+00

TABLE 12

(Various data)

Zooming ratio 15.17308

| | Wide-angle limit | Middle position | Telephoto limit |
|---|---|---|---|
| Focal length | 4.6454 | 18.6011 | 70.4851 |
| F-number | 3.38793 | 5.02654 | 6.10042 |
| View angle | 42.3892 | 11.8634 | 3.1098 |
| Image height | 3.6000 | 3.9020 | 3.9020 |
| Overall length of lens system | 49.9957 | 57.8547 | 68.9731 |
| BF | 0.47349 | 0.51758 | 0.46322 |
| d6 | 0.3000 | 12.6258 | 23.5760 |
| d12 | 17.7000 | 5.4577 | 0.9788 |
| d19 | 2.1955 | 9.9270 | 14.6285 |
| d21 | 4.9324 | 2.9361 | 7.2490 |
| d23 | 4.8258 | 6.8220 | 2.5091 |
| Entrance pupil position | 10.8136 | 38.2184 | 114.5491 |
| Exit pupil position | −28.7786 | −44.4433 | 1118.4999 |
| Front principal points position | 14.7213 | 49.1238 | 189.4779 |
| Back principal points position | 45.3503 | 39.2536 | −1.5120 |

Single lens data

| Lens element | Initial surface number | Focal length |
|---|---|---|
| 1 | 1 | −77.6591 |
| 2 | 3 | 49.4947 |
| 3 | 5 | 53.6937 |
| 4 | 7 | −7.4514 |
| 5 | 9 | −11.4308 |
| 6 | 11 | 15.7620 |
| 7 | 14 | 7.3701 |
| 8 | 16 | 16.5135 |
| 9 | 18 | −8.3009 |
| 10 | 20 | −23.6188 |
| 11 | 22 | 17.5112 |

Zoom lens unit data

| Lens unit | Initial surface No. | Focal length | Overall length of lens unit | Front principal points position | Back principal points position |
|---|---|---|---|---|---|
| 1 | 1 | 38.92659 | 5.25360 | 1.24863 | 3.19119 |
| 2 | 7 | −6.17776 | 5.65500 | 0.49349 | 1.37523 |
| 3 | 13 | 10.32366 | 5.32740 | −0.66309 | 1.47357 |
| 4 | 20 | −23.61882 | 0.50000 | 0.31970 | 0.52249 |
| 5 | 22 | 17.51125 | 2.05250 | 0.28977 | 0.97860 |

TABLE 12-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.20666 | −0.35167 | −0.93363 |
| 3 | 13 | −0.55962 | −1.45383 | −1.66046 |
| 4 | 20 | 1.70081 | 1.90677 | 1.57931 |
| 5 | 22 | 0.60668 | 0.49017 | 0.73957 |

Numerical Example 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 60.44880 | 0.75000 | 1.84666 | 23.8 |
| 2 | 32.03080 | 0.01000 | 1.56732 | 42.8 |
| 3 | 32.03080 | 2.69580 | 1.49700 | 81.6 |
| 4 | −97.40450 | 0.15000 | | |
| 5 | 23.51180 | 1.52140 | 1.72916 | 54.7 |
| 6 | 51.12920 | Variable | | |
| 7* | 29.68640 | 0.30000 | 1.84973 | 40.6 |
| 8* | 5.34170 | 3.77130 | | |
| 9 | −8.04110 | 0.30000 | 1.71300 | 53.9 |
| 10 | −1265.83730 | 0.15000 | | |
| 11 | 25.77440 | 1.19890 | 1.94595 | 18.0 |
| 12 | −39.44190 | Variable | | |
| 13(Diaphragm) | ∞ | 0.30000 | | |
| 14* | 5.08260 | 3.01780 | 1.51845 | 70.0 |
| 15 | −16.92640 | 0.37410 | | |
| 16 | 56.25890 | 1.36760 | 1.69680 | 55.5 |
| 17 | −8.68290 | 0.01000 | 1.56732 | 42.8 |
| 18 | −8.68290 | 0.40000 | 1.68400 | 31.3 |
| 19* | 12.09960 | Variable | | |
| 20 | 24.95430 | 0.50000 | 1.84973 | 40.6 |
| 21* | 10.33060 | Variable | | |
| 22* | 9.80520 | 2.05250 | 1.51845 | 70.0 |
| 23* | 148.40800 | 2.17600 | | |
| 24 | ∞ | 0.78000 | 1.51680 | 64.2 |
| 25 | ∞ | (BF) | | |
| Image surface | ∞ | | | |

TABLE 14

(Aspherical data)

Surface No. 7

K = 0.00000E+00, A4 = −1.72513E−04, A6 = 6.87473E−06,
A8 = −9.75804E−08 A10 = −1.15455E−10, A12 = 0.00000E+00

Surface No. 8

K = 0.00000E+00, A4 = −2.93125E−04, A6 = −1.17933E−05,
A8 = 1.18518E−06 A10 = −3.01318E−08, A12 = 0.00000E+00

Surface No. 14

K = 0.00000E+00, A4 = −3.63811E−04, A6 = −1.60178E−05,
A8 = 7.88634E−08 A10 = −4.79116E−08, A12 = 0.00000E+00

TABLE 14-continued (Aspherical data)

Surface No. 19

K = 0.00000E+00, A4 = 1.84153E−03, A6 = 7.85211E−05,
A8 = 2.94963E−07 A10 = 4.92755E−07, A12 = 0.00000E+00

Surface No. 21

K = 0.00000E+00, A4 = 5.84721E−06, A6 = 1.04792E−05,
A8 = −1.02352E−06 A10 = 3.69061E−08, A12 = 0.00000E+00

Surface No. 22

K = 0.00000E+00, A4 = −4.66373E−04, A6 = 3.73697E−05,
A8 = −2.11059E−06 A10 = 7.56353E−08, A12 = −1.97886E−09

Surface No. 23

K = 0.00000E+00, A4 = −8.17898E−04, A6 = 4.11654E−05,
A8 = −1.45941E−06 A10 = −2.94317E−09, A12 = 0.00000E+00

TABLE 15

(Various data)

Zooming ratio 15.16640

| | Wide-angle limit | Middle position | Telephoto limit |
|---|---|---|---|
| Focal length | 4.6485 | 18.5973 | 70.5004 |
| F-number | 3.38965 | 5.06465 | 6.10061 |
| View angle | 42.2782 | 11.6312 | 3.1412 |
| Image height | 3.6000 | 3.9020 | 3.9020 |
| Overall length of lens system | 50.5302 | 55.3093 | 68.9739 |
| BF | 0.47867 | 0.51734 | 0.46373 |
| d6 | 0.3000 | 11.6054 | 23.5100 |
| d12 | 18.9958 | 5.5910 | 0.9017 |
| d19 | 2.4533 | 10.9617 | 12.4382 |
| d21 | 6.4770 | 4.8085 | 9.8349 |
| Entrance pupil position | 10.7742 | 33.7420 | 105.8678 |
| Exit pupil position | −28.2436 | −42.2486 | −264.1589 |
| Front principal points position | 14.6703 | 44.2520 | 157.5856 |
| Back principal points position | 45.8817 | 36.7120 | −1.5265 |

Single lens data

| Lens element | Initial surface number | Focal length |
|---|---|---|
| 1 | 1 | −81.4588 |
| 2 | 3 | 48.8375 |
| 3 | 5 | 58.3413 |
| 4 | 7 | −7.7093 |
| 5 | 9 | −11.3511 |
| 6 | 11 | 16.6273 |
| 7 | 14 | 7.9098 |
| 8 | 16 | 10.8892 |
| 9 | 18 | −7.3333 |
| 10 | 20 | −21.0770 |
| 11 | 22 | 20.1486 |

Zoom lens unit data

| Lens unit | Initial surface No. | Focal length | Overall length of lens unit | Front principal points position | Back principal points position |
|---|---|---|---|---|---|
| 1 | 1 | 39.64625 | 5.12720 | 1.38976 | 3.27251 |
| 2 | 7 | −6.16334 | 5.72020 | 0.56057 | 1.44047 |
| 3 | 13 | 9.77084 | 5.46950 | −0.59752 | 1.63155 |
| 4 | 20 | −21.07697 | 0.50000 | 0.46862 | 0.69400 |
| 5 | 22 | 20.14859 | 5.00850 | −0.09514 | 0.87821 |

TABLE 15-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.20032 | −0.31668 | −0.81551 |
| 3 | 13 | −0.48120 | −1.28268 | −1.62775 |
| 4 | 20 | 1.57711 | 1.50104 | 1.73524 |
| 5 | 22 | 0.77125 | 0.76933 | 0.77199 |

Numerical Example 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1 | 46.75190 | 2.65650 | 1.49700 | 81.6 |
| 2 | −58.74640 | 0.01000 | 1.56732 | 42.8 |
| 3 | −58.74640 | 0.75000 | 2.00272 | 19.3 |
| 4 | −134.86740 | 0.15000 | | |
| 5 | 27.19460 | 1.57300 | 1.69680 | 55.5 |
| 6 | 83.02160 | Variable | | |
| 7* | 28.89600 | 0.30000 | 1.85135 | 40.1 |
| 8* | 5.15710 | 3.78950 | | |
| 9 | −7.93880 | 0.30000 | 1.71300 | 53.9 |
| 10 | −256.72580 | 0.15000 | | |
| 11 | 27.62940 | 1.21450 | 1.94595 | 18.0 |
| 12 | −33.20460 | Variable | | |
| 13(Diaphragm) | ∞ | 0.30000 | | |
| 14* | 4.90800 | 3.07470 | 1.52501 | 70.3 |
| 15* | −13.24560 | 0.78790 | | |
| 16 | −17.78870 | 1.09340 | 1.69680 | 55.5 |
| 17 | −6.59430 | 0.01000 | 1.56732 | 42.8 |
| 18 | −6.59430 | 0.40000 | 1.68400 | 31.3 |
| 19* | 22.60770 | Variable | | |
| 20 | 63.00600 | 0.50000 | 1.68400 | 31.3 |
| 21* | 15.88000 | Variable | | |
| 22* | 11.66450 | 1.91960 | 1.52501 | 70.3 |
| 23* | −68.00180 | Variable | | |
| 24 | ∞ | 0.78000 | 1.51680 | 64.2 |
| 25 | ∞ | (BF) | | |
| Image surface | ∞ | | | |

TABLE 17

(Aspherical data)

Surface No. 7

K = 0.00000E+00, A4 = −1.99668E−04, A6 = 8.31248E−06,
A8 = −1.61821E−07 A10 = 9.42854E−10, A12 = 0.00000E+00
Surface No. 8

K = 0.00000E+00, A4 = −3.69464E−04, A6 = −1.94870E−05,
A8 = 1.80882E−06 A10 = −6.49892E−08, A12 = 0.00000E+00
Surface No. 14

K = 0.00000E+00, A4 = −2.42537E−04, A6 = −1.73202E−05,
A8 = 1.99941E−07 A10 = −5.74143E−08, A12 = 0.00000E+00

TABLE 17-continued (Aspherical data)

Surface No. 15

K = 0.00000E+00, A4 = 3.53310E−04, A6 = −2.15028E−05,
A8 = 6.83562E−07 A10 = 0.00000E+00, A12 = 0.00000E+00
Surface No. 19

K = 0.00000E+00, A4 = 1.76798E−03, A6 = 1.01479E−04,
A8 = −2.20701E−08 A10 = 5.30247E−07, A12 = 0.00000E+00
Surface No. 21

K = 0.00000E+00, A4 = −3.44609E−06, A6 = 3.37595E−06,
A8 = −1.52317E−08 A10 = −1.18245E−09, A12 = 0.00000E+00
Surface No. 22

K = 0.00000E+00, A4 = −5.97461E−04, A6 = 2.82900E−05,
A8 = −1.54049E−06 A10 = 2.96146E−08, A12 = −7.59166E−10
Surface No. 23

K = 0.00000E+00, A4 = −6.67729E−04, A6 = 2.20877E−05,
A8 = −9.57433E−07 A10 = −3.56583E−09, A12 = 0.00000E+00

TABLE 18

(Various data)

Zooming ratio 15.16103

| | Wide-angle limit | Middle position | Telephoto limit |
|---|---|---|---|
| Focal length | 4.6500 | 18.5999 | 70.4984 |
| F-number | 3.39068 | 4.71336 | 6.10116 |
| View angle | 42.3492 | 11.9249 | 3.1092 |
| Image height | 3.6000 | 3.9020 | 3.9020 |
| Overall length of lens system | 49.6088 | 57.0332 | 68.9781 |
| BF | 0.49473 | 0.51212 | 0.46799 |
| d6 | 0.3000 | 11.5490 | 22.2968 |
| d12 | 17.6999 | 5.1424 | 0.8542 |
| d19 | 1.4677 | 10.1832 | 15.7126 |
| d21 | 5.5904 | 2.5771 | 7.3873 |
| d23 | 4.2970 | 7.3103 | 2.5001 |
| Entrance pupil position | 10.7539 | 34.9443 | 105.3609 |
| Exit pupil position | −27.8954 | −43.7550 | 989.4102 |
| Front principal points position | 14.6422 | 45.7290 | 180.8849 |
| Back principal points position | 44.9589 | 38.4333 | −1.5203 |

Single lens data

| Lens element | Initial surface number | Focal length |
|---|---|---|
| 1 | 1 | 52.8235 |
| 2 | 3 | −104.3159 |
| 3 | 5 | 57.3751 |
| 4 | 7 | −7.4166 |
| 5 | 9 | −11.4954 |
| 6 | 11 | 16.0988 |
| 7 | 14 | 7.2434 |
| 8 | 16 | 14.4585 |
| 9 | 18 | −7.4224 |
| 10 | 20 | −31.1739 |
| 11 | 22 | 19.1234 |

Zoom lens unit data

| Lens unit | Initial surface No. | Focal length | Overall length of lens unit | Front principal points position | Back principal points position |
|---|---|---|---|---|---|
| 1 | 1 | 37.58433 | 5.13950 | 1.24965 | 3.14016 |
| 2 | 7 | −6.16937 | 5.75400 | 0.46007 | 1.28009 |
| 3 | 13 | 10.48749 | 5.66600 | −1.07855 | 1.22001 |

TABLE 18-continued (Various data)

| 4 | 20 | −31.17392 | 0.50000 | 0.39868 | 0.60048 |
|---|----|-----------|---------|---------|---------|
| 5 | 22 | 19.12344  | 1.91960 | 0.18584 | 0.83617 |

Magnification of zoom lens unit

| Lens unit | Initial surface No. | Wide-angle limit | Middle position | Telephoto limit |
|---|---|---|---|---|
| 1 | 1  | 0.00000  | 0.00000  | 0.00000  |
| 2 | 7  | −0.21529 | −0.35443 | −0.92651 |
| 3 | 13 | −0.57925 | −1.63708 | −1.85705 |
| 4 | 20 | 1.48987  | 1.68094  | 1.43210  |
| 5 | 22 | 0.66589  | 0.50741  | 0.76125  |

The following Table 19 shows the corresponding values to the individual conditions in the zoom lens systems of the numerical examples.

TABLE 19

(Corresponding values to conditions)

| | | Example | | | | | |
|---|---|---|---|---|---|---|---|
| Condition | | 1 | 2 | 3 | 4 | 5 | 6 |
| (1-2) | $f_{G1}/Ir$ | 9.34 | 9.28 | 10.28 | 10.17 | 10.25 | 9.81 |
| (a) | $f_T/f_W$ | 9.40 | 9.39 | 15.16 | 15.17 | 15.17 | 15.16 |
| (2) | $(L_{12T}-L_{12W}) \times f_{G1}/Ir^2$ | 43.08 | 41.33 | 64.66 | 61.79 | 61.47 | 56.38 |
| (3) | $f_{G3}/D_{G3}$ | 2.75 | 2.75 | 2.11 | 2.05 | 1.89 | 1.95 |
| (4) | $f_{G1}/f_{G4}$ | −0.81 | −0.61 | −2.17 | −1.65 | −1.88 | −1.21 |
| (5) | $f_{G1}/f_W$ | 7.69 | 7.64 | 8.47 | 8.38 | 8.53 | 8.08 |
| (6) | $L_T/f_{G3}$ | 5.42 | 5.36 | 6.90 | 6.68 | 7.06 | 6.58 |

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system, in order from an object side to an image side, comprising a first lens unit having positive optical power, a second lens unit having negative optical power, a third lens unit having positive optical power, a fourth lens unit having negative optical power, and a fifth lens unit having positive optical power, wherein the third lens unit includes at least one lens element having positive optical power and at least one lens element having negative optical power, in zooming from a wide-angle limit to a telephoto limit at the time of image taking, at least the first lens unit, the second lens unit, and the third lens unit are individually moved along an optical axis so that air spaces between the respective lens units vary, thereby performing magnification change, in focusing from an infinity in-focus condition to a close-object in-focus condition, a lens unit positioned on the image side relative to an aperture diaphragm is moved along the optical axis, and the following conditions are satisfied:

$$8.1 < f_{G1}/Ir < 10.4$$

$$Z = f_T/f_W \geq 9.0$$

where $f_{G1}$ is a composite focal length of the first lens unit,

Ir is a value represented by the following equation:

$$Ir = f_T \times \tan(\omega_T),$$

$\omega_T$ is a half view angle (°) at a telephoto limit, $f_T$ is a focal length of the entire system at a telephoto limit, and $f_W$ is a focal length of the entire system at a wide-angle limit.

2. The zoom lens system, as claimed in claim 1, wherein the following condition is satisfied:

$$28.8 < (L_{12T}-L_{12W}) \times f_{G1}/Ir^2 < 70.0$$

where $L_{12T}$ is an interval between the first lens unit and the second lens unit at a telephoto limit, $L_{12W}$ is an interval between the first lens unit and the second lens unit at a wide-angle limit, $f_{G1}$ is a composite focal length of the first lens unit, Ir is a value represented by the following equation:

$$Ir = f_T \times \tan(\omega_T),$$

$\omega_T$ is a half view angle (°) at a telephoto limit, and $f_T$ is a focal length of the entire system at a telephoto limit.

3. The zoom lens system, as claimed in claim 1, wherein the following condition is satisfied:

$$1.85 < f_{G3}/D_{G3} < 4.29$$

where $f_{G3}$ is a composite focal length of the third lens unit, and $D_{G3}$ is an optical axial thickness of the third lens unit.

4. The zoom lens system, as claimed in claim 1, wherein the following condition is satisfied:

$$-4.2 < f_{G1}/f_{G4} < -0.5$$

where $f_{G1}$ is a composite focal length of the first lens unit, and $f_{G4}$ is a composite focal length of the fourth lens unit.

5. The zoom lens system, as claimed in claim 1, wherein the following condition is satisfied:

$$6.0 < f_{G1}/F_W < 9.4$$

where $f_{G1}$ is a composite focal length of the first lens unit, and $f_W$ is a focal length of the entire system at a wide-angle limit.

6. The zoom lens system, as claimed in claim 1, wherein the following condition is satisfied:

$$4.3 < L_T/f_{G3} < 7.4$$

where $L_T$ is an overall length of lens system at a telephoto limit (a distance from the most object side surface of the first lens unit to the image surface), and $f_{G3}$ is a composite focal length of the third lens unit.

7. The zoom lens system as claimed in claim 1, wherein the fourth lens unit is composed of one lens element.

8. The zoom lens system as claimed in claim 1, wherein the fifth lens unit is composed of one lens element.

9. The zoom lens system as claimed in claim 1, wherein the fourth lens unit is moved along the optical axis in focusing from an infinity in-focus condition to a close-object in-focus condition.

10. An imaging device capable of outputting an optical image of an object as an electric image signal, comprising:
- a zoom lens system that forms an optical image of the object; and
- an image sensor that converts the optical image formed by the zoom lens system into the electric image signal, wherein
- the zoom lens is the zoom lens system as claimed in claim 1.

11. A camera for converting an optical image of an object into an electric image signal and then performing at least one of displaying and storing of the converted image signal, comprising:
- an imaging device including a zoom lens system that forms the optical image of the object and an image sensor that converts the optical image formed by the zoom lens system into the electric image signal, wherein
- the zoom lens is the zoom lens system as claimed in claim 1.

* * * * *